US010303323B2

(12) United States Patent
Gribetz

(10) Patent No.: US 10,303,323 B2
(45) Date of Patent: May 28, 2019

(54) SYSTEM AND METHOD FOR FACILITATING USER INTERACTION WITH A THREE-DIMENSIONAL VIRTUAL ENVIRONMENT IN RESPONSE TO USER INPUT INTO A CONTROL DEVICE HAVING A GRAPHICAL INTERFACE

(71) Applicant: META COMPANY, San Mateo, CA (US)

(72) Inventor: Yishai Gribetz, Belmont, CA (US)

(73) Assignee: Meta Company, San Mateo, CA (US)

( * ) Notice: Subject to any disclaimer, the term of this patent is extended or adjusted under 35 U.S.C. 154(b) by 221 days.

(21) Appl. No.: 15/158,550

(22) Filed: May 18, 2016

(65) Prior Publication Data

US 2017/0336941 A1 Nov. 23, 2017

(51) Int. Cl.
*G06F 3/0481* (2013.01)
*G06F 3/0482* (2013.01)
*G06F 3/0484* (2013.01)
*G06T 19/00* (2011.01)
(Continued)

(52) U.S. Cl.
CPC ........ *G06F 3/04815* (2013.01); *G06F 3/0482* (2013.01); *G06F 3/04842* (2013.01); *G06T 13/20* (2013.01); *G06T 19/006* (2013.01); *G06T 19/20* (2013.01); *G06T 2200/24* (2013.01); *G06T 2219/2016* (2013.01)

(58) Field of Classification Search
CPC .............. G06F 3/04815; G06F 3/0482; G06F 3/04842; G06T 19/006
See application file for complete search history.

(56) References Cited

U.S. PATENT DOCUMENTS 9,041,743 B2 * 5/2015 McArdle ................. G06T 15/20
345/660
9,317,971 B2 * 4/2016 Lamb .................... G06T 19/006
9,723,300 B2 * 8/2017 Riedel ................ G02B 27/2235
(Continued)

OTHER PUBLICATIONS

International Search Report and Written Opinion for PCTIB2017052948 dated Aug. 11, 2017, 16 pages.

*Primary Examiner* — William L Bashore
*Assistant Examiner* — Gregory A Distefano
(74) *Attorney, Agent, or Firm* — Sheppard Mullin Richter & Hampton LLP

(57) ABSTRACT

The methods, systems, techniques, and components described herein may facilitate user interactions with virtual objects in a three-dimensional virtual environment using user input into a graphical interface of a control device that is coupled to a display that may display the three-dimensional virtual environment. The control device may be configured to display a 3D representation of a virtual object having a non-virtual reality representation of the virtual object. The graphical interface of the control device may receive selection information that corresponds to a user selection of the 3D representation of the virtual object. Transformation parameters that provide a basis for rendering a three-dimensional representation of a virtual object in the three-dimensional virtual environment may be obtained to define a transformation of the 3D representation of the virtual object. The transformation parameters may be applied to compose a 3D representation of a virtual object that represents the virtual object in the three-dimensional virtual environment.

36 Claims, 30 Drawing Sheets

(51) Int. Cl.
    *G06T 13/20*    (2011.01)
    *G06T 19/20*    (2011.01)

(56) References Cited

U.S. PATENT DOCUMENTS

| | | |
|---|---|---|
| 9,983,697 B1 | 5/2018 | Gribetz |
| 2002/0158905 A1 | 10/2002 | Bazzoni |
| 2009/0070093 A1 | 3/2009 | Nakanishi |
| 2010/0177931 A1* | 7/2010 | Whytock ............... G06F 3/0416 382/103 |
| 2012/0229454 A1 | 9/2012 | Hayashi |
| 2013/0104084 A1 | 4/2013 | Mlyniec |
| 2013/0117377 A1* | 5/2013 | Miller .................... H04L 67/38 709/205 |
| 2014/0152558 A1 | 6/2014 | Salter |
| 2014/0198101 A1* | 7/2014 | Vilkin .................... G06T 13/20 345/419 |
| 2014/0204002 A1 | 7/2014 | Bennet |
| 2014/0267637 A1* | 9/2014 | Hoberman ......... H04N 13/0429 348/53 |
| 2014/0306891 A1 | 10/2014 | Latta |
| 2015/0371441 A1* | 12/2015 | Shim ...................... G06T 17/00 345/420 |
| 2017/0060230 A1 | 3/2017 | Faaborg |
| 2017/0153866 A1* | 6/2017 | Grinberg ............. G02B 27/017 |
| 2017/0235143 A1 | 8/2017 | Chi |
| 2017/0294051 A1* | 10/2017 | Harviainen .......... G06T 19/006 |
| 2017/0336941 A1 | 11/2017 | Gribetz |

* cited by examiner

SYSTEM AND METHOD FOR FACILITATING USER INTERACTION WITH A THREE-DIMENSIONAL VIRTUAL ENVIRONMENT IN RESPONSE TO USER INPUT INTO A CONTROL DEVICE HAVING A GRAPHICAL INTERFACE

FIELD

The disclosure relates to facilitating user interactions with a three-dimensional virtual environment, such as a three-dimensional Virtual Reality (VR) environment or a three-dimensional Augmented Reality (AR) environment, in response to user input into a control device having a graphical interface.

BACKGROUND

It may be difficult to model many interactions with virtual environments, particularly three-dimensional virtual environments. Typically, when a virtual object is displayed in a three-dimensional virtual environment, the virtual object becomes a focus of a user's attention. While the user may find it convenient to take some virtual actions on the virtual object, the user may find it difficult or less convenient to take other virtual actions on the virtual object. As an example, a user may find it convenient to perform some types of translations/rotations of a virtual object in a three-dimensional virtual environment, but may find it difficult or less convenient to perform other types of translations/rotations or to use virtual menu systems that are displayed in the three-dimensional virtual environment.

It may be desirable for interactions with virtual objects in a three-dimensional virtual environment to appear realistic, credible, natural, and/or fluid. These problems may persist in pure-Virtual Reality (VR) environments where virtual objects do not correspond to and/or are not superimposed over real-world objects in the real-world, as well as Augmented Reality (AR) and/or mixed environments where virtual objects may correspond to and/or be superimposed over real-world objects that reside in the physical world.

SUMMARY

The methods, systems, techniques, and components described herein may facilitate user interactions with virtual objects in a three-dimensional virtual environment through user input into a real world control device having a graphical interface. The control device may be coupled to a display—for example, a head mounted display—that may be configured to display the three-dimensional virtual environment. In some implementations, the graphical interface of the control device may receive selection information that corresponds to a user selection or modification of a two-dimensional (2D) representation of a virtual object displayed on the graphical interface. The selection information may comprise a selection from a virtual menu supported by the graphical interface of the control device. The virtual menu may include, for instance, a menu supported by an application, a process, and/or an operating system executing on the control device. The virtual menu may, but need not, comprise a virtual menu that is called using Application Programming Interfaces (APIs) supported by the operating system of the control device.

In various implementations, transformation parameters may be obtained to define a transformation of the 2D representation of the virtual object. The transformation parameters may be applied to compose a three-dimensional (3D) representation of the virtual object that represents the virtual object in the three-dimensional virtual environment. Instructions may be provided to a display system to display a three-dimensional representation of the 3D representation of the virtual object in the three-dimensional virtual environment. The display system may be incorporated into a headset that displays an immersive three-dimensional virtual environment to a user.

In some implementations, one or more animation parameters may be gathered that facilitate illustration of an animated transformation of the 3D representation of the virtual object based on user selection information that corresponds to a user selection or modification of a 2D representation of the virtual object.

In some implementations, information from sensors may be used to form a point cloud related to a user interaction element. The user interaction element may comprise a real-world object (a user's hand, a stylus, an object attached to or worn by a user, etc.). The point cloud may provide data representative of an interaction between the user interaction element and the 3D representation of the virtual object. A second 3D representation of the virtual object may be created based on the interaction between the point cloud and the three-dimensional virtual environment. The second 3D representation of the virtual object may comprise a modified version of the virtual object in the three-dimensional virtual environment, and may replace the original virtual object in the three-dimensional virtual environment. As an example, the second 3D representation of the virtual object may include a version of the virtual object that has received and/or responded to the user interaction.

In some implementations, identifying the interaction between the point cloud of the user interaction element and the 3D representation of the virtual object may comprise: assigning a first virtual charge to the point cloud; assigning a second virtual charge to the 3D representation of the virtual object; and identifying a virtual force between the first charge and the second charge; and creating the second 3D representation of the virtual object comprises using the virtual force to model the interaction between the point cloud and the 3D representation of the virtual object.

In some implementations, the systems, methods, and computer-readable media described herein may support one or more three-dimensional virtual reality applications. The virtual object may comprise virtual painting, and the 3D representation of the virtual object may be a three-dimensional representation of the virtual painting displayed in the three-dimensional virtual environment. The virtual object may comprise a shape in the three-dimensional virtual reality application. The virtual object may comprise a virtual screen of an application executing on the control device. In some implementations, a virtual screen may appear to arise out of the control device into the three-dimensional virtual environment. The virtual screen may receive user interactions, including one or more gestures in the three-dimensional virtual environment. The user interactions may be taken from sensor data that captures interactions between a user interaction element and a three-dimensional virtual object.

The detailed description herein is merely exemplary in nature and is not intended to limit the described implementations (examples, options, etc.) or the application and uses of the described implementations. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the implementations of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary implementations (examples), aspects and/or concepts. Hence, specific dimensions and other physical characteristics relating to the implementations disclosed herein are not to be considered as limiting, except in the context of any claims which expressly state otherwise. It is understood that "at least one" is equivalent to "a."

The aspects (examples, alterations, modifications, options, variations, implementations and any equivalent thereof) are described with reference to the drawings; it should be understood that the descriptions herein show by way of illustration various implementations in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate implementations may not have been presented for a specific portion of the invention or that further alternate implementations which are not described may be available for a portion is not to be considered a disclaimer of those alternate implementations. It will be appreciated that many implementations not described incorporate the same principles of the invention and others that are equivalent. Thus, it is to be understood that other implementations may be utilized and functional, logical, organizational, structural and/or topological modifications may be made without departing from the scope and/or spirit of the disclosure.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

I. Example Virtual Environment Control System 100

Figure 1:
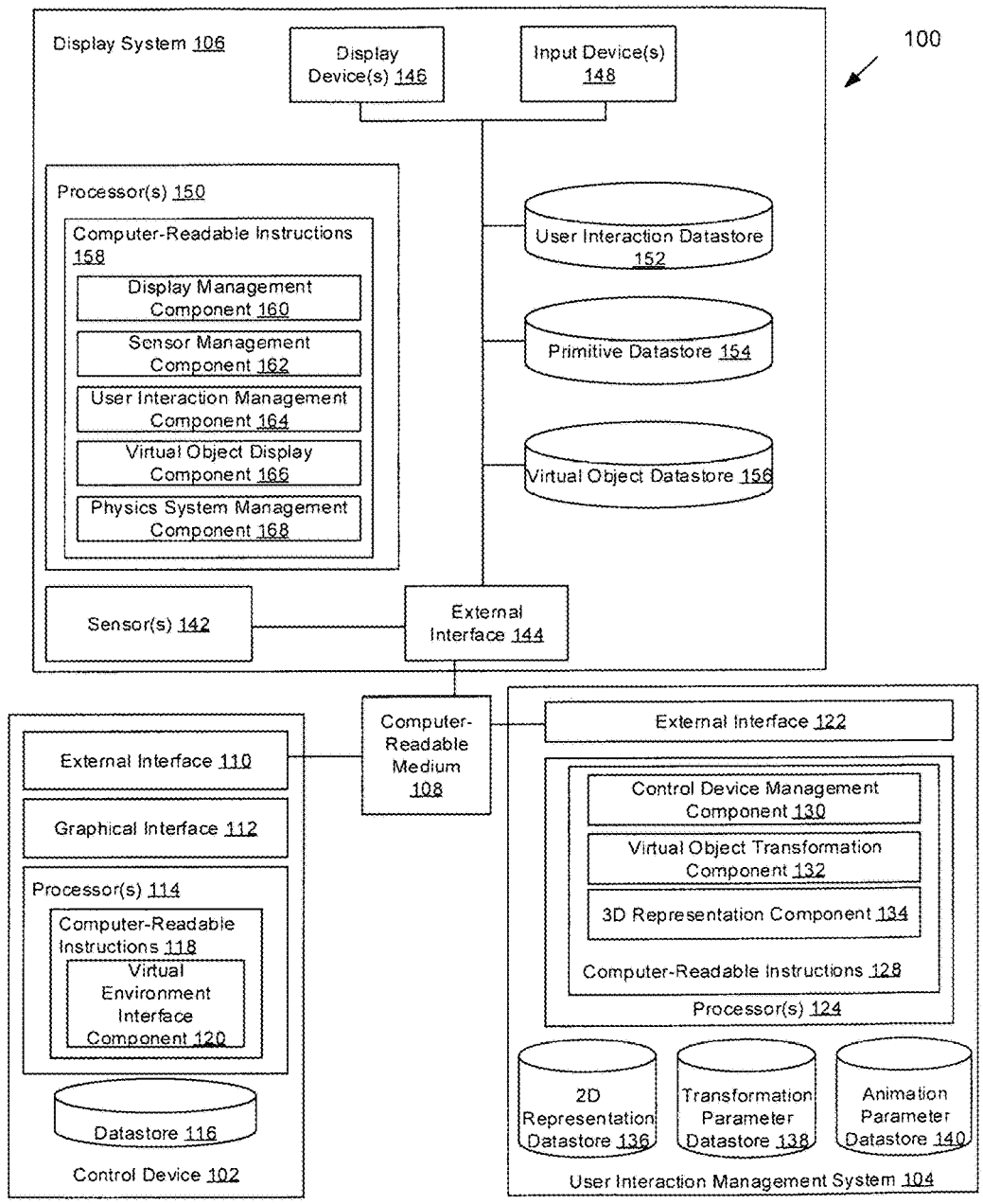
FIG. 1 illustrates an example of a virtual environment control system, in accordance with some implementations.

FIG. 1 illustrates an example of a virtual environment control system 100, in accordance with some implementations. The virtual environment control system 100 may include a control device 102, a user interaction management system 104, a display system 106, and a computer-readable medium 108. The control device 102, the user interaction management system 104, and the display system 106 may be coupled to one another through the computer-readable medium 108. It is expressly noted the couplings shown in FIG. 1 are by way of example only, and that in various implementations, one or more of the control device 102, the user interaction management system 104, and the display system 106 may be incorporated within one another and/or otherwise configured without departing from the scope and substance of the inventive concepts described herein.

A. Control Device 102

The control device 102 may include a digital device that allows a user to provide instructions to the display system 106 to control a three-dimensional virtual environment and/or virtual objects displayed in the three-dimensional virtual environment. In some implementations, the control device 102 may comprise a mobile phone, a tablet computing device, or other computer having a touchscreen display.

A "virtual environment," as used herein, may refer to a virtual space that represents an environment, real or imaginary, and simulates a user's presence in a way that allows the user to interact with the environment. A virtual environment may, but need not, contain "virtual objects," which as used herein, may refer to any objects that are displayed in the virtual environment but are not part of the physical world.

A "virtual element" may include an element used to build or otherwise make up a virtual object. Virtual elements and/or virtual objects may be assembled from primitives, discussed further herein. As also discussed further herein, the virtual environment may facilitate interactions with virtual objects. Examples of interactions include moving, resizing, rotating, etc. the virtual objects within the virtual environment. It is further noted that a "real world object" may comprise any object in the physical world, and may include animate items, inanimate items, physical objects/elements used to form the basis of a point cloud, etc. A "three-dimensional virtual environment," as used herein, may refer to a virtual environment that is capable of displaying three-dimensional virtual objects to a user.

The three-dimensional virtual environment may be part of a pure-VR environment or an AR/mixed reality environment. A "pure-VR environment," as used herein, may include a virtual environment that does not display the physical world to a user. In a pure-VR environment, virtual objects need not correspond to and/or need not be superimposed over real-world objects in the physical world. An "AR environment," or interchangeably, a "mixed-reality environment," as used herein, may refer to a virtual environment that displays the physical world to a user. The portions of the physical world visible to a user may correspond to a physical environment around the user.

An AR environment may include attributes of a virtual environment, including virtual objects superimposed over portions of the physical environment. In some implementations, an AR environment may represent physical objects in the physical world as virtual objects in the augmented environment and/or may superimpose virtual objects over a perspective of the physical world. The virtual objects may, but need not, appear to a user to be different from the physical objects that the virtual objects correspond to in the virtual environment. As an example, a virtual object representing a computer screen in an augmented environment may have the same size dimensions, etc. as the physical object (i.e., the computer screen); however, the virtual object may also have different size dimensions, etc. than the physical object. As discussed further herein, an AR environment may facilitate interactions with virtual objects. Examples of interactions include moving, resizing, rotating, etc. the virtual objects within the augmented environment.

The control device 102 may include an external interface 110, a graphical interface 112, processor(s) 114, and a datastore 116. The external interface 110 may comprise any computer-readable medium that couples the components of the control device 102 to one another. In some implementations, at least a portion of the external interface 110 includes a bus or other data conduit or data plane. In various implementations, the external interface 110 may support a coupling and/or connection to the computer-readable medium 108.

The graphical interface 112 may include hardware configured to display graphical information to a user and to receive input from the user. The graphical interface 112 may comprise a touchscreen display. In some implementations, the graphical interface 112 may, but need not, comprise a backlit display that is illuminated by one or more illumination devices that reside behind the graphical interface 112. The illumination devices may comprise Liquid Crystal Display (LCD) elements, Light Emitting Diodes (LEDs) etc. In some implementations, the graphical interface 112 is configured by the virtual environment interface component 120 to display a 2D representation of a virtual object, as described further herein.

The processor(s) 114 may be configured to provide information processing capabilities to components of the control device 102. In some implementations, the processor(s) 114 may include one or more of a digital processor, an analog processor, a digital circuit designed to process information, an analog circuit designed to process information, a state machine, and/or other mechanisms for electronically processing information. The processor(s) 114 may include single processor, a plurality of processing units (e.g., a plurality of CPUs and/or GPUs), etc. which may or may not be physically located within the same device or a plurality of devices operating in coordination.

The processor(s) 114 may be configured to execute one or more computer-readable instructions 118. In some implementations, the processor(s) 114 may be configured to execute the computer-readable instructions 118 by software, hardware, firmware, or some combination of software, hardware, and/or firmware; and/or other mechanisms for configuring processing capabilities on processor(s) 114.

The description of the functionality provided by the components in the computer-readable instructions 118 described herein is for illustrative purposes, and is not intended to be limiting, as any of the components in the computer-readable instructions 118 may provide more or less functionality than is described. For example, one or more of the components in the computer-readable instructions 118 may be eliminated, and some or all of its functionality may be provided by other components in the computer-readable instructions 118. As another example, the processor(s) 114 may be configured to execute one or more additional components that may perform some or all of the functionality attributed herein to any of the components illustrated to reside in the computer-readable instructions 118.

The computer-readable instructions 118 may include a virtual environment interface component 120. In various implementations, the virtual environment interface component 120 may be configured to facilitate interactions between a user of the control device 102 and a three-dimensional virtual environment displayed by the display system 106. In some implementations, the virtual environment interface component 120 may support an application, a component of an application (e.g., a web browsing component), a process, etc., that displays to a user of the control device 102 a 2D representation of the virtual object on the graphical interface 112.

A "2D representation of the virtual object," as used herein, may refer to a representation on the control device 102 of a virtual object, that in turn can be displayed in a three-dimensional virtual environment. The 2D representation of the virtual object may comprise a representation of a virtual object that is also being displayed in a three-dimensional virtual environment by display system 106. The 2D representation of the virtual object may include an element displayed in a control application on the control device 102, such as an icon, image, and/or interactive element in a control application on the control device 102. The 2D representation of the virtual object may comprise a user interface element on a control application on the control device 102. The 2D representation of the virtual object may comprise an icon, a menu item, hyperlink, etc. displayed on a control application accessible through the graphical interface 112. In some examples, the 2D representation of the virtual object may comprise a representation of one or more virtual shapes (virtual cubes, virtual spheres, etc.) that can be displayed in the three-dimensional virtual environment by display system 106. In some examples, the 2D representation of the virtual object may comprise a representation of a home or other screen of an application (e.g., a web browsing application, a painting application, etc.) on the control device 102.

The 2D representation of the virtual object may, but need not, be visually similar to the three-dimensional virtual object. In some implementations, the 2D representation of the virtual object may comprise a two-dimensional representation of the three-dimensional virtual object. The 2D representation of the virtual object may comprise a compressed and/or re-rendered representation of the three-dimensional virtual object that is in a format suitable for the control device. The 2D representation of the virtual object may comprise a representation of another image that is associated with the three-dimensional virtual object.

In various implementations, the virtual environment interface component 120 may receive instructions to control a three-dimensional virtual environment through instructions provided to the graphical interface 112. The virtual environment interface component 120 may support on the graphical interface 112 one or more graphical controls that allow manipulation, modification, selection, etc. of virtual objects and/or properties of virtual objects in a three-dimensional virtual environment displayed by the display system 106.

The datastore 116 may include a datastore configured to support the virtual environment interface component 120. The datastore 116 may have one or more attributes of the other datastores described further herein.

B. User Interaction Management System 104

The user interaction management system 104 may include a digital device that supports control of the display system 106 through instructions provided to the control device 102. The user interaction management system 104 may include an external interface 122, processor(s) 124, a 2D representation datastore 136, and a transformation parameter datastore 138. Though the user interaction management system 104 is depicted in FIG. 1 as a separate device, it is noted the components shown in the user interaction management system 104 may be incorporated into the control device 102 and/or the display system 106. In some implementations, the user interaction management system 104 may be incorporated into the display system 106 and coupled to the components of the display system 106 a computer-readable medium residing therein.

The external interface 122 may comprise any computer-readable medium that couples the components of the control device 102 to one another. The external interface 122 may support a coupling and/or connection to the computer-readable medium 108.

The processor(s) 124 may be configured to provide information processing capabilities to components of the user interaction management system 104. In some implementations, the processor(s) 124 may include one or more of a digital processor, an analog processor, a digital circuit designed to process information, an analog circuit designed to process information, a state machine, and/or other mechanisms for electronically processing information. The processor(s) 124 may include single processor, a plurality of processing units (e.g., a plurality of CPUs and/or GPUs), etc. which may or may not be physically located within the same device or a plurality of devices operating in coordination.

The processor(s) 124 may be configured to execute one or more computer-readable instructions 128. In some implementations, the processor(s) 124 may be configured to execute the computer-readable instructions 128 by software, hardware, firmware, or some combination of software, hardware, and/or firmware; and/or other mechanisms for configuring processing capabilities on processor(s) 124.

The computer-readable instructions 128 may include a control device management component 130, a virtual object transformation component 132, and a 3D representation management component 134. The description of the functionality provided by the components in the computer-readable instructions 128 described herein is for illustrative purposes, and is not intended to be limiting, as any of the components in the computer-readable instructions 128 may provide more or less functionality than is described. For example, one or more of the components in the computer-readable instructions 128 may be eliminated, and some or all of its functionality may be provided by other components in the computer-readable instructions 128. As another example, the processor(s) 124 may be configured to execute one or more additional components that may perform some or all of the functionality attributed herein to any of the components illustrated to reside in the computer-readable instructions 128.

The control device management component 130 may be configured to manage the virtual environment interface component 120 on the control device 102. In some implementations, the control device management component 130 may provide the control device 102 with 2D representations of virtual objects gathered from the 2D representation datastore 136. The control device management component 130 may further cause the control device 102 to display a 3D representation of the virtual object on the graphical interface 112 by providing instructions to the virtual environment interface component 120 to configure the graphical interface 112 to display the 3D representation of the virtual object. The control device management component 130 may further receive selections and/or modifications related to a 3D representation of a virtual object entered into the graphical interface 112. The control device management component 130 may include one or more backend processes that support the virtual environment interface component 120.

The virtual object transformation component 132 may be configured to manage transformations that transform a 3D representation of a virtual object into a 3D representation of a virtual. A "3D representation of a virtual object," as used herein, may refer to a representation of a virtual object in a three-dimensional virtual environment displayed on the display system 106. In some implementations, the 3D representation of the virtual object may comprise a portion of a pure-VR environment. The 3D representation of the virtual object may comprise a portion of an AR/mixed reality environment; the 3D representation of the virtual object may correspond to/be superimposed over real-world physical objects or other real-world items in the physical world.

In some implementations, the virtual object transformation component 132 may be configured to obtain transformation parameters from the transformation parameter datastore 138 to transform a 2D representation of a virtual object into a 3D representation of a virtual object. "Transformation parameters," as used herein, may refer to parameters used to transform a first representation of a virtual object represented on the control device to a second representation of the virtual object in a three-dimensional virtual environment. In various implementations, the transformation parameters may comprise entries in the transformation parameter datastore 138 that identify specific virtual objects in the three-dimensional virtual environment based on corresponding virtual objects (icons, 2D representations, etc.) on the control device 102. In some implementations, the transformation parameters may, but need not, identify portions of virtual objects, such as specific virtual primitive elements used to compose the virtual objects. The transformation parameters may provide a basis for rendering a three-dimensional representation of a virtual object in the three-dimensional virtual environment displayed on the display system 106.

The representation management component 134 may be configured to provide instructions to the display system 106 to compose a 3D representation of a virtual object in a three-dimensional virtual environment displayed by the display system 106. In various implementations, the 3D representation management component 134 may instruct the virtual object display component 166 to select specific virtual objects from the virtual object datastore 156 that represent the virtual object being presented in a three-dimensional virtual environment.

The 3D representation management component 134 may further provide instructions to the display system 106 to display an animated transformation in the three-dimensional virtual environment. An "animated transformation," as used herein, may refer to a series of images or video content in the three-dimensional virtual environment that shows the 2D representation of a virtual object transforming into the 3D representation of the virtual object. The animated transformation may be displayed in the three-dimensional virtual environment. The animated transformation may, e.g., show the 2D representation of the virtual object floating out of the control device 102 and forming boundaries of the 3D representation of the virtual object in the three-dimensional virtual environment. In some implementations, the animated transformation may show the 2D representation of the virtual object floating out of the control device 102 to form the 3D representation of the virtual object in the virtual environment. The animated transformation may show the 2D representation of the virtual object transforming into the 3D representation of the virtual object or otherwise changing shape/size/etc. In some implementations, the 3D representation management component 134 may gather one or more animation parameters from the animation parameter datastore 140 for the animated transformation.

The 2D representation datastore 136 may include a datastore configured to store 2D representations of virtual objects. The transformation parameter datastore 138 may include a datastore configured to store transformation parameters. The animation parameter datastore 140 may include a datastore configured to store animation parameters.

Figure 2:
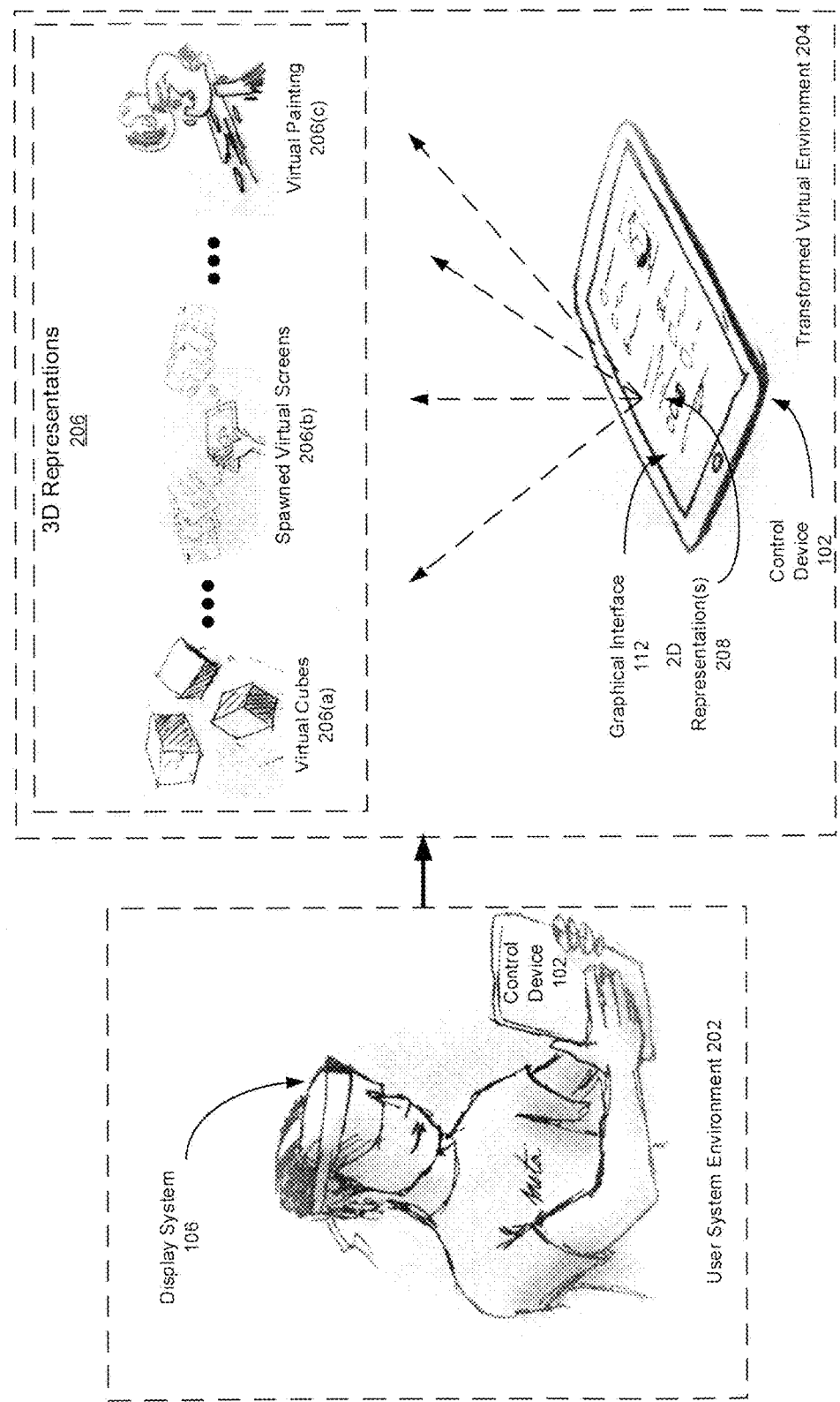
FIG. 2 illustrates an example of a user system environment and a transformed virtual environment, in accordance with one or more implementations.

In various implementations, the user interaction management system 104 may operate to allow the control device 102 to control the display system 106 to display a 3D representation of the virtual object corresponding to the 2D representation of the virtual object displayed on the control device 102. The example operation may be shown with respect to FIGS. 2, 3A, 3B, 3C, 3D, and 3E. Turning to FIG. 2, FIG. 2 illustrates an example of a user system environment 202 and a transformed virtual environment 204, in accordance with one or more implementations.

In the example of FIG. 2, the user system environment 202 includes the control device 102 and the display system 106. As shown in the user system environment 202, a user may be using the display system 106 to view a three-dimensional virtual environment displayed thereon. The user may also be near (e.g., may be holding) the control device 102.

The transformed virtual environment 204 may represent the user's field of view through the display system 106. In some implementations, the transformed virtual environment 204 may show an AR/mixed reality field of view in which virtual objects are superimposed over portions of the physical world. The transformed virtual environment 204 may include a perspective of the control device 102 where a 2D representation of a virtual object 2D representation 208 is represented on the graphical interface 112 of the control device 102. The transformed virtual environment 204 may further include one or more 3D representation(s) 206 that correspond to virtual objects represented by the 2D representation 208. Examples of the 3D representation(s) 206 include virtual cubes 206(a) that appear to reside in the three-dimensional virtual environment, spawned virtual screens 206(b) that correspond to screens of applications on the control device 102, and a virtual painting 206(c) that appears in the three-dimensional virtual environment with which the user may or may not be able to interact.

Figure 3A:
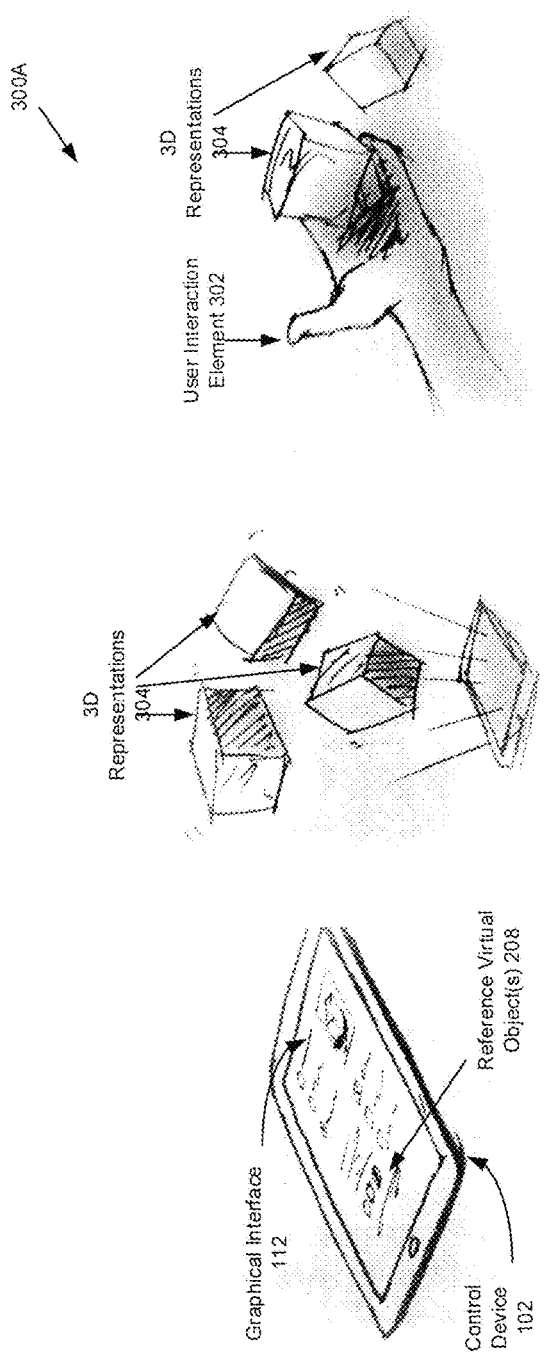
FIG. 3A illustrates an example of a transformed virtual environment that includes a plurality of 3D representations of virtual objects that represent a virtual shape in a virtual environment, in accordance with some implementations.

Turning to FIG. 3A, FIG. 3A illustrates an example of a transformed virtual environment 300A that includes a plurality of 3D representations 304 that represent a virtual shape in a virtual environment, in accordance with some implementations. In this example, the plurality of 3D representations 304 may comprise a plurality of virtual shapes (e.g., cubes) that appear to float out of the graphical interface 112 of the control device 102. As shown in FIG. 3, a user interaction element 302, such as a user's hand, may be able to interact with the virtual cubes using a variety of techniques. Relevant interaction techniques may include collisions in the three-dimensional virtual environment that result from modeling the user interaction element 302 as a virtual object that can collide with the 3D representations 304. Relevant interaction techniques may further include the results of virtual physics calculations that are caused by interactions between the 3D representations 304 and a point cloud representative of the user interaction element 302 and discussed further herein.

Figure 3B:
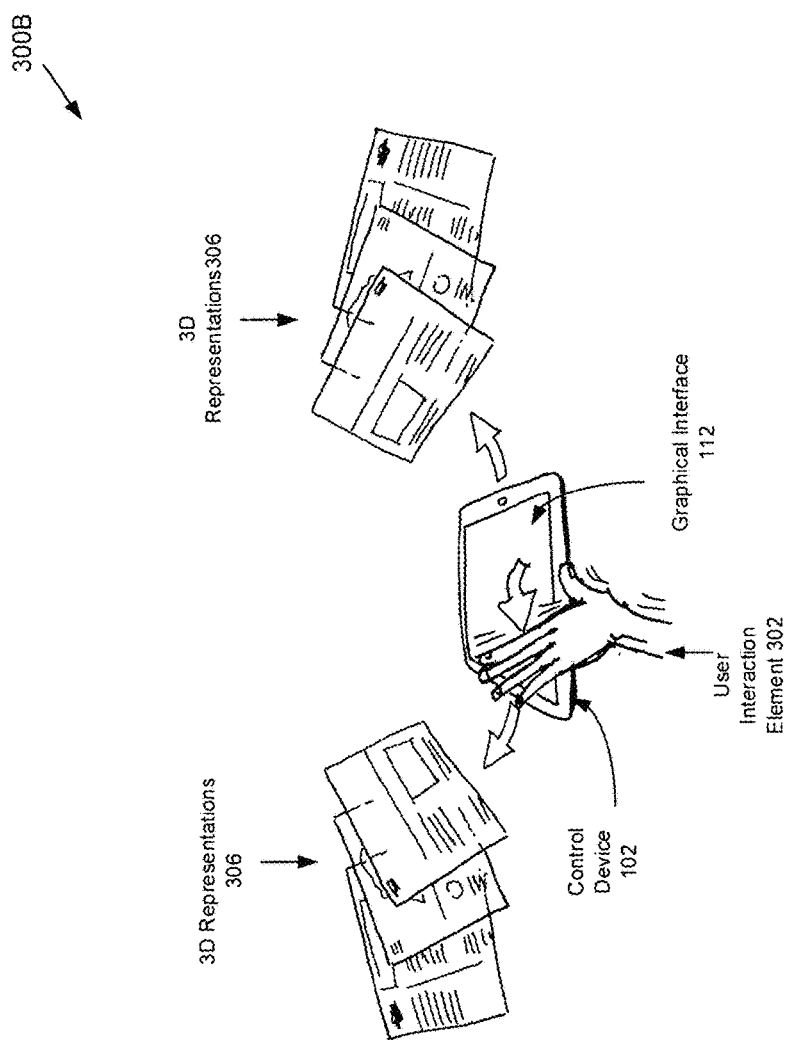
FIG. 3B illustrates an example of a transformed virtual environment that includes a plurality of 3D representations of virtual objects that represent a plurality of virtual screens in a virtual environment, in accordance with some implementations.

Turning to FIG. 3B, FIG. 3B illustrates an example of a transformed virtual environment 300B that includes a plurality of 3D representations 306 that represent a plurality of virtual screens in a virtual environment, in accordance with some implementations. In this example, the plurality of 3D representations 306 may comprise virtual screens that represent content that may be displayed on the graphical interface 112 by an application of the control device 102. The virtual screens could, for instance, represent the content of different web browser tabs/windows or of other application tabs/windows. A user interaction element 302, such as a user's hand, may be able to interact with the virtual screens using a variety of techniques. Relevant interaction techniques may include collisions in the three-dimensional virtual environment that result from modeling the user interaction element 302 as a virtual object that can collide with the representations 306. Relevant interaction techniques may further include the results of virtual physics calculations that are caused by interactions between the 3D representations 306 and a point cloud gathered from sensor data and representative of the user interaction element 302 and discussed further herein. The user interaction element 302 may be able to swipe, pinch, zoom, translate, rotate, etc. the 3D representations 306 as if the 3D representations 306 were virtual objects that could be moved in three-dimensional space.

Figure 3C:
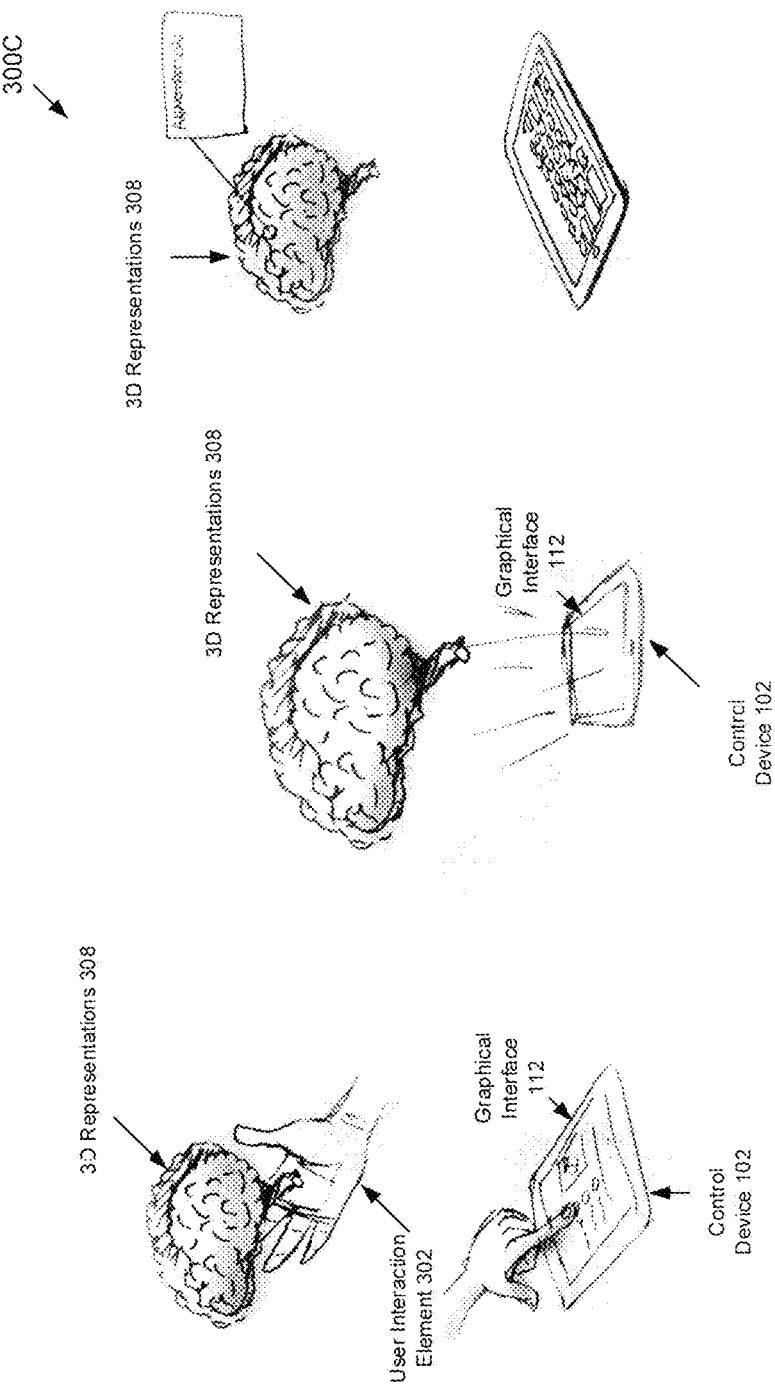
FIG. 3C illustrates an example of a transformed virtual environment that includes a 3D representations of virtual objects that represents a hyperlinked virtual object displayed a virtual environment, in accordance with some implementations.

Turning to FIG. 3C, FIG. 3C illustrates an example of a transformed virtual environment 300C that includes a 3D representation 308 that represents a hyperlinked or HTML-embedded virtual object displayed a virtual environment, in accordance with some implementations. In some implementations, a user has selected a 2D representation of a virtual object on the graphical interface 112 that corresponds to the 3D representation 308. Within the three-dimensional virtual environment, the 3D representation 308 may appear to arise out of the graphical interface 112. A user may be able to interact with the 3D representation 308 by, e.g., using the user interaction element 302 to peel off layers of the 3D representations 308 to investigate anatomy/structure, rotate and/or resize perspectives, and/or take other actions. Relevant interaction techniques may include collisions in the three-dimensional virtual environment that result from modeling the user interaction element 302 as a virtual object that can collide with the 3D representation 308. Relevant interaction techniques may further include the results of virtual physics calculations that are caused by interactions between the 3D representation 308 and a point cloud gathered from sensor data and representative of the user interaction element 302 and discussed further herein.

Figure 3D:
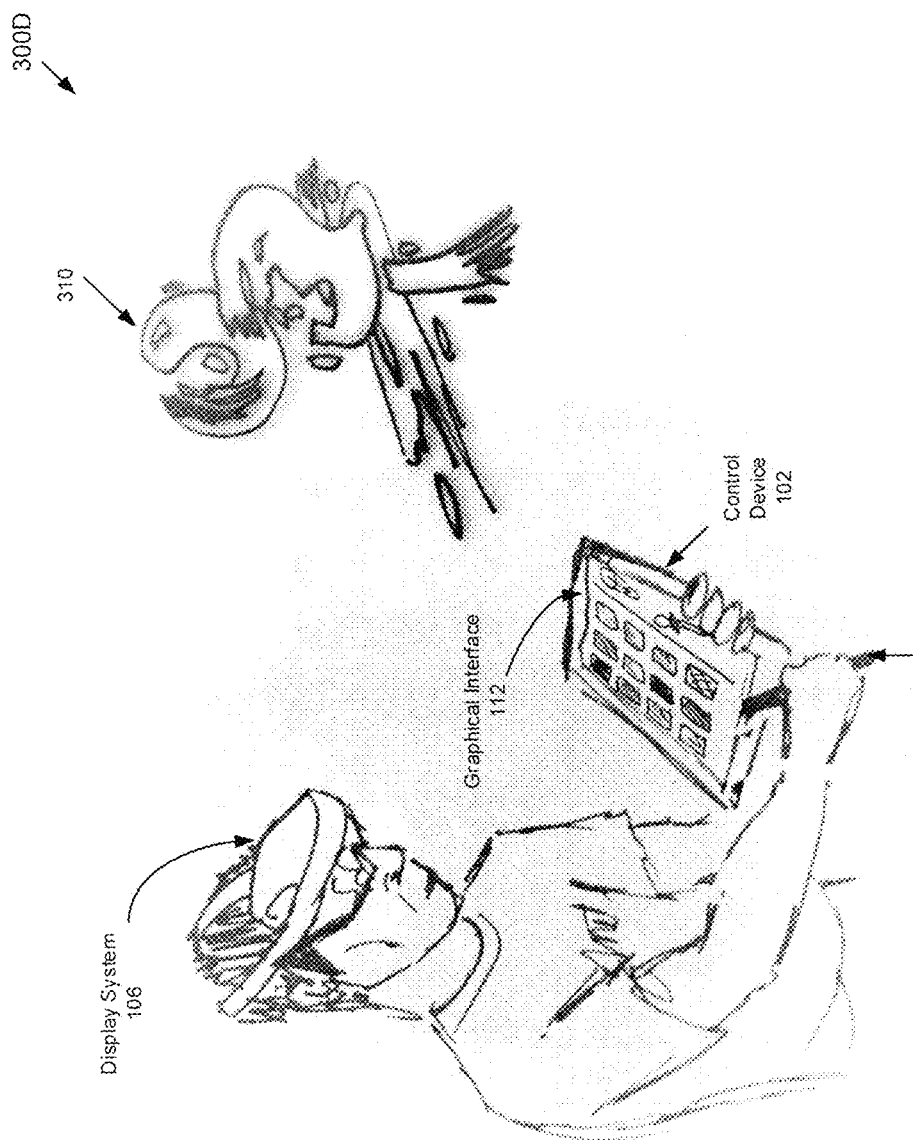
FIG. 3D illustrates an example that includes a transformed virtual environment of a 3D representation of a virtual object that represents a virtual painting displayed a virtual environment, in accordance with some implementations.

FIG. 3D illustrates an example of a transformed virtual environment 300D that includes a 3D representation 310 that represents a virtual painting displayed a virtual environment, in accordance with some implementations. In this example, the control device 102 may display to the user a palette of colors, painting implements (brushes, pencils, pens, erasers, sample shapes, etc.) that the user can use to paint within the three-dimensional virtual environment. The palette and/or other painting tools may, but need not, change depending on the perspective of the user and/or the field of view of the display system 106.

Further, at least a portion of the 3D representation 310 may have arisen out of the graphical interface 112 of the control device and is visible in the three-dimensional virtual environment displayed to the user on the display system 106. The user may interact with the 3D representation 310 using the user interaction element 302 (e.g., a stylus). The user may add, e.g., colors, lines, textures, shapes, etc. to the 3D representation 310 by interacting with the 3D representation 310 in the three-dimensional virtual environment. As such, the user may create and/or modify a three-dimensional painting by interacting with the 3D representation 310 in the three-dimensional virtual environment. Relevant interaction techniques may include collisions in the three-dimensional virtual environment that result from modeling the user interaction element 302 as a virtual object that can collide with the 3D representation 310. Relevant interaction techniques may further include the results of virtual physics calculations that are caused by interactions between the 3D representation 310 and a point cloud gathered from sensor data and representative of the user interaction element 302 and discussed further herein.

In some implementations, the systems and methods herein may use the control device 102 to control colors, configurations, etc. on any virtual object (e.g., a 3D model of a car displayed in the virtual environment, any shopping experience, etc.) In an architecture application, for instance, the control device 102 may comprise physical control(s) for placing architectural elements if one prefers to have the physical object in hand instead of using a virtual control pad or buttons.

In some implementations, the user may make a selection into a control pad on the control device 102 that has some effect on the three-dimensional virtual environment. With the painting app, this may comprise a selection of a color or toggle of a switch (e.g., "paint" versus "erase" function). With the architectural example, it could be selection of "brick" or "wood siding", or an Ionian versus Corinthian column, on the control device 102, and then you can place those elements in the virtual space. The existence of some kind of button, toggle or icon on the control panel of the control device 102 that has an effect in the 3D space might be able to be analogized in some way to the application's current disclosure of a 2D virtual object that then transforms into a 3D object in the three-dimensional virtual environment.

Figure 3E:
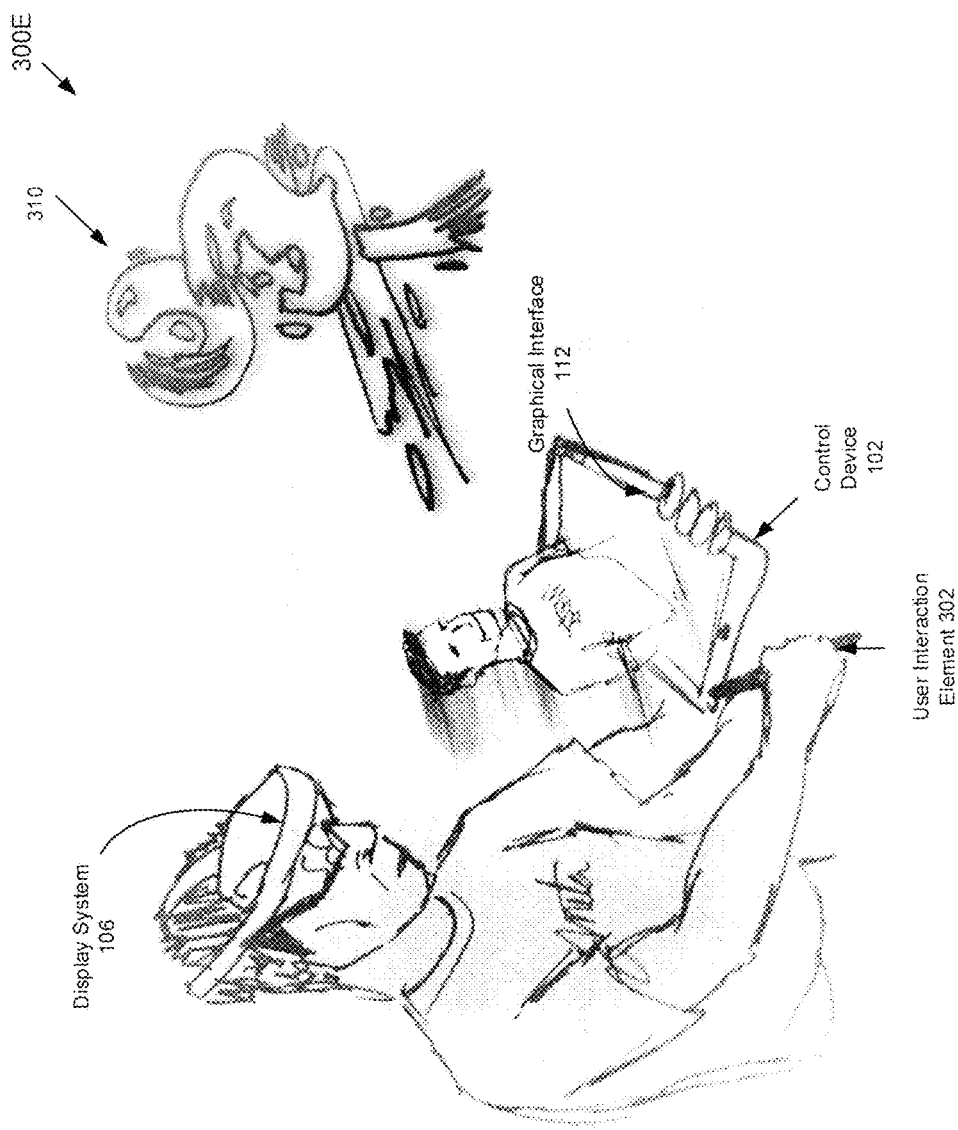
FIG. 3E illustrates an example that includes a transformed virtual environment of a 3D representation of a 3D representation of a virtual object that represents a virtual painting displayed a virtual environment, in accordance with some implementations.

FIG. 3E illustrates an example of a transformed virtual environment 300E that includes a 3D representation 310 that represents a virtual painting displayed a virtual environment, in accordance with some implementations. In this example, the user has provided instructions into the control device 102 to share the 3D representation 310 with another user. The control device 102 may share the 3D representation 310 with the other user using one or more communication channels, including but not limited to, electronic mail, social media, Short Message Service (SMS) messaging, and Multimedia Messaging Service (MMS) messaging.

C. Display System 106

The display system 106 may comprise a digital device configured to display a three-dimensional virtual environment to a user. In some implementations, the display system 106 may comprise a dedicated headset configured to display a three-dimensional virtual environment. In various implementations, the display system 106 may be incorporated into a portable computing device, such as a wireless phone, a tablet computing device, a laptop, etc. The three-dimensional virtual environment provided by the display system 106 may comprise a pure-VR environment or an AR/mixed reality environment. The display system 106 may include sensor(s) 142, an external interface 144, a display device(s) 146, input device(s) 148, processor(s) 150, a user interaction datastore 152, a primitive datastore 154, and a virtual object datastore 156. The display system 106 may include some or all of the components of the example Head Mounted Display (HMD) system 1700, shown in FIGS. 17A, 17B, 17C, 17D, and 17E.

a. Sensor(s) 142, External Interface 144, Display Device(s) 146, Input Device(s) 148, and Processor(s) 150

The sensor(s) 142 may include one or more devices that obtain sensor data about a physical property (light, motion, distance, sound, heat, pressure, magnetism, etc.) in the physical world and provide one or more components of the display system 106 with a signal that represents the sensor data. In some implementations, the sensor(s) 142 include a motion sensor that senses movement of a user or of a component of the display system 106. The sensor(s) 142 may also include an Inertial Measurement Unit (IMU), an accelerometer, a gyroscope, etc. that senses translational and/or rotational motion by a user or of a component of the display system 106. In some implementations, the sensor(s) 142 may include a camera that gathers images of a physical environment surrounding a user or a component of the display system 106. The camera may comprise a still camera that captures still images of the physical environment or a motion camera that captures videos or other motion pictures of the physical environment. In various implementations, the sensor(s) 142 comprise a depth-camera. A "depth-camera," as used herein, may refer to a device or a component that has the capability to capture still and/or moving images, and has the ability to sense distances of objects away from it.

In various implementations, the sensor(s) 142 may form a part of a pure-VR system that senses behavior of a user, the physical environment around a user, and/or other physical properties. In some VR implementations, the sensor(s) 142 may include IMUs, accelerometers, gyroscopes, etc. that provide movement data related to how a user is moving; the movement data may be used as the basis of perspectives, etc. used in a virtual environment managed by the VR system. The sensors(s) 202 may include depth sensors, cameras, and/or other devices that sense the physical environment around a user. In some implementations, the sensor(s) 142 may sense contours and/or provide meshes that correspond to the shapes of real-world objects in the physical environment surrounding the display system 106. The sensor(s) 142 may be incorporated into a pure-VR system.

In some implementations, the sensor(s) 142 may form a part of an AR/mixed reality system. The sensor(s) 142 may include IMUs, accelerometers, gyroscopes, etc. that provide movement data related to how a user is moving; the movement data may be used as the basis of perspectives, etc. used in an augmented environment. Further, in some implementations, the sensor(s) may comprise a depth-camera used in an AR/mixed reality system to capture still and/or moving images of the physical environment and to provide distances of objects away from the depth-camera for use in the AR environment. The sensor(s) 142 may sense contours and/or provide meshes that correspond to the shapes of real-world objects in the physical environment surrounding the display system 106.

The external interface 144 may comprise any computer-readable medium that couples the other components of the display system 106 to one another. In some implementations, at least a portion of the external interface 144 includes a bus or other data conduit or data plane. In some implementations, at least two components of the display system 106 are co-located on a single digital device. Further, in various implementations, at least a portion of the external interface 144 includes a computer network or a part of a computer network. In various implementations, at least two components of the display system 106 are located on different digital devices that are coupled to one another by the computer network. It is noted that the computer network may include a wireless or a wired back-end network or a Local Area Network (LAN). In some implementations, the computer network encompasses a relevant portion of a Wide Area Network (WAN) and/or other network. In various implementations, the external interface 144 may support a coupling and/or connection to the computer-readable medium 108.

The display device(s) 146 may include one or more devices that are configured to display images, video, and/or other data to a user. In some implementations, the display device(s) 146 are implemented using Cathode Ray Tube (CRT), Plasma Display, Liquid Crystal Display (LCD), Light Emitting Diode (LED) technologies, and/or fiber optic projector systems. The display device(s) 146 may be configured to display a virtual environment, either alone (in replacement of the real world environment), or in an augmented environment. In some implementations, the display device(s) 146 displays virtual objects, interactions with virtual objects, etc. In some implementations, the display device(s) 146 may comprise at least a portion of the input device(s) 148 as discussed further herein. For instance, at least a portion of the input device(s) 148 may be incorporated into the display device(s) 146. The display device(s) 146 may include a transparent portion that allows a user to see at least a portion of the physical world around the user. As an example, the display device(s) 146 may comprise transparent see-through glass/plastic/other material on which users can see virtual objects superimposed over the physical world and/or representative of real-world objects.

The display system 106 may, but need not include one more input device(s) 148. The input device(s) 148 may include one or more devices that receive user input from a user. The input device(s) 148 may comprise physical keyboards, joysticks, mice, trackpads, other peripherals, and/or portions of a touchscreen display. As an example, the input device(s) 148 may, in some implementations, comprise portions of touch-screen displays that facilitate and/or initiate interactions with virtual environments supported by the systems and methods herein. The input device(s) 148 may be configured to display menus related to selection and/or manipulation of virtual objects, related to aspects of a three-dimensional virtual environment, and/or related to facilitating interaction with virtual objects (e.g., 3D representations of virtual objects) in a three-dimensional virtual environment.

The processor(s) 150 may be configured to provide information processing capabilities to components of the display system 106. In some implementations, the processor(s) 150 may include one or more of a digital processor, an analog processor, a digital circuit designed to process information, an analog circuit designed to process information, a state machine, and/or other mechanisms for electronically processing information.

Although the processor(s) 150 are shown in FIG. 1 as a single block, this is for illustrative purposes only. In some implementations, processor(s) 150 may include a plurality of processing units (e.g., a plurality of CPUs and/or GPUs). These processing units may be physically located within the same device, or processor(s) 150 may represent processing functionality of a plurality of devices operating in coordination. The processor(s) 150 may be configured to execute one or more computer-readable instructions 158. In some implementations, the processor(s) 150 may be configured to execute the computer-readable instructions 158 by software, hardware, firmware, or some combination of software, hardware, and/or firmware; and/or other mechanisms for configuring processing capabilities on processor(s) 150.

b. Computer-Readable Instructions 158

The computer-readable instructions 158 may include a display management component 160, a sensor management component 162, a user interaction management component 164, a virtual object display component 166, and a physics system management component 168. It should be appreciated that although these components are illustrated in FIG. 2 as being co-located within a single processing unit (e.g., the processor(s) 150), in implementations in which processor(s) 150 includes only some of these components, with the other components being located remotely from the processor(s) 150.

The description of the functionality provided by the components in the computer-readable instructions 158 described herein is for illustrative purposes, and is not intended to be limiting, as any of the components in the computer-readable instructions 158 may provide more or less functionality than is described. For example, one or more of the components in the computer-readable instructions 158 may be eliminated, and some or all of its functionality may be provided by other components in the computer-readable instructions 158. As another example, the processor(s) 150 may be configured to execute one or more additional components that may perform some or all of the functionality attributed herein to any of the components illustrated to reside in the computer-readable instructions 158.

(1) Display Management Component 160

The display management component 160 may include computer-readable instructions configured to manage the display device(s) 146. In some implementations, the display management component 160 includes instructions for addressing portions of the display device(s) 146 to display specific aspects of a virtual environment, either alone, or as part of an augmented environment. For example, the display management component 160 may include instructions to address specific pixels of the display device(s) 146 with specific colors, images, virtual objects, etc. that are provided to the user as part of a virtual environment. In various implementations, the display management component 160 may select specific colors, images, virtual objects, etc. based on attributes of the physical environment surrounding a user to implement an augmented environment. In various implementations, the display management component 160 may select specific colors, images, virtual objects, etc. based on a state of a virtual environment and/or user interactions taken (e.g., user interactions taken on virtual objects) in the virtual environment. The display management component 160 may configure the display device(s) 146 to display a three-dimensional virtual environment that includes one or more 3D representations of virtual objects, as described further herein.

(2) Sensor Management Component 162

The sensor management component 162 may include computer-readable instructions configured to manage the sensor(s) 142. The sensor management component 162 may be coupled to graphics processing hardware, software, and/or firmware for processing images, and/or other hardware, software, and/or firmware for processing other forms of sensor data. In various implementations, the sensor management component 162 obtains image, depth, and/or other data from the sensor(s) 142 and extracts image information, depth and/or other positional information, etc. from the data. The sensor management component 162 may be configured to provide the extracted information to the physics system management component 168 and/or other components of the display system 106.

(3) User interaction Management Component 164

The user interaction management component 164 may include computer-readable instructions configured to manage user interactions from devices that can receive user interactions, including but not limited to the input device(s) 148 and/or other devices coupled to the display system 106. In some implementations, the user interaction management component 164 is coupled to peripheral processing hardware, software, and/or firmware that may manage the devices that receive user interactions.

The user interaction management component 164 may provide to the physics system management component 168 any user interaction data that is based on user input into the devices that receive user interactions. "User interaction data," as discussed herein, may refer to user input into the devices that receive user interactions, the input allowing a user to interact with at least a portion of a virtual environment supported by the display system 106 (e.g., a three-dimensional virtual environment displayed on the display device(s) 146). In some implementations, the user interaction data may comprise interactions with at least portions of a virtual environment, such as interactions with three-dimensional virtual objects in a virtual environment. The virtual environment may, but need not, be incorporated in an augmented environment, as discussed further herein. In some implementations, the user interaction management component 164 may recognize and/or receive one or more "gestures," or user interactions that can be recognized as specific attempts to interact with the virtual environment.

In some implementations, the user interaction data managed by the user interaction management component 164 may be based on sensor data from the sensor(s) 142 and/or managed by the sensor management component 162. The sensor data may be based on images taken, e.g., by a still or motion camera coupled to and/or implemented by the sensor(s) 142. The sensor data may be based on depth points (e.g., points along a line orthogonal to the sensor(s) 142) taken by a depth-sensor coupled to and/or implemented by the sensor(s) 142. In various implementations, the sensor data is taken from IMUs, gyroscopes, accelerometers, and/or other motion sensors coupled to and/or implemented by the sensor(s) 142.

In various implementations, the user interaction management component 164 may identify portions of the virtual environment that correspond to specific user interactions. The user interaction management component 164 may identify where sensor data obtained from the sensor(s) 142 and/or managed by the sensor management component 162 is to be projected into a virtual environment managed by the display system 106. As examples, the user interaction management component 164 may identify if/whether specific user interactions or gestures are related to known virtual points, etc. in the virtual environment. The user interaction management component 164 may further identify whether these virtual points correspond to locations of virtual objects, virtual coordinates/locations, etc. in the virtual environment. In various implementations, the user interaction management component 164 may modify a state, a property, etc. of a virtual object, virtual coordinate/location etc. based on one or more user interactions. The user interaction management component 164 may, for instance, provide instructions to modify an interactive volume of a virtual object, such as a 3D representation of a virtual object displayed in a three-dimensional virtual environment based on user interaction data.

(4) Virtual Object Display Component 166

The virtual object display component 166 may include computer-readable instructions configured to instruct the display device(s) 106 to display a three-dimensional virtual environment and/or to display virtual objects, including 3D representations of virtual objects in the three-dimensional virtual environment.

In some implementations, the virtual object display component 166 may receive instructions from the 3D representation management component 134 to select a specific virtual object for display in the three-dimensional virtual environment. The instructions may specify the specific virtual object as well as attributes of the virtual object used to render the virtual object in the three-dimensional virtual environment. As examples, the instructions may specify specific virtual perspectives of virtual objects, specific movements of virtual objects in the three-dimensional virtual environment, and/or specific virtual physical properties of virtual objects provided in response to interactions managed by the physics system management component 168 described further herein. The virtual object display component 166 may animate the display of a 3D representation of a virtual object based on one or more animation parameters identified by the 3D representation management component 134.

(5) Physics System Management Component 168

The physics system management component 168 may include computer-readable instructions configured to manage a physics system for a virtual environment supported by the display system 106. A "physics system," as used herein, may refer to a set of rules that govern physical relationships of virtual objects in the virtual environment. In some implementations, the physics system implemented by the physics system management component 168 may implement rules for force determination in the virtual environment, rules to select and/or manage primitives that form the basis of virtual objects in the virtual environment, rules to define interactive volumes of virtual objects in the virtual environment, and/or rules that allow for and/or define manipulation of virtual objects in the virtual environment.

(a) Force Determinations by Physics System Management Component 168

In some implementations, the physics system management component 168 implements force determinations for virtual objects in a virtual environment. In various implementations, the physics system management component 168 may gather virtual objects from the virtual object datastore 156, and may implement force determinations on these virtual objects based on rules assigned to those virtual objects and/or user interaction data from the user interaction management component 164.

One example of the types of force determinations that may be applied includes force determinations based on virtual electromagnetic forces between virtual objects in the virtual environment. Though the discussion herein discusses force determinations based on virtual electromagnetic forces (e.g., on Coulomb's Law) in greater detail, it is noted that the physics system management component 168 may determine virtual forces between virtual objects based on any virtual physical forces and/or other forces, including but not limited to virtual gravitational forces, virtual thermodynamic forces, virtual chemical forces, virtual atomic weak forces, virtual atomic strong forces, etc.

Figure 4:
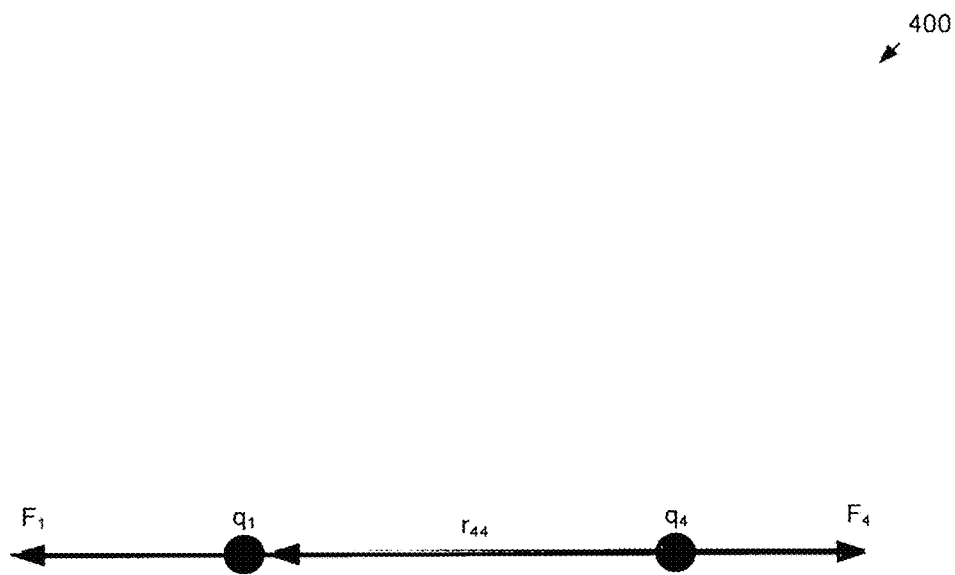
FIG. 4 illustrates an example of a force diagram showing manipulation of virtual input/output (I/O) elements using forces, in accordance with one or more implementations.

As a result, in some implementations, the physics system management component 168 determines forces between virtual objects based on virtual electromagnetic forces between the virtual objects. Turning to FIG. 4, FIG. 4 shows an illustration 400 of an example of how force may be applied to virtual objects and/or virtual objects. By assigning a charge to a point associated with a virtual object and a separate charge to a point of input associated with a real world element and/or real-world object detected by a sensing device, the elements' interaction can be governed by Coulomb's Law, which models the electric forces between two charges. For example, the magnitude of the electrostatic force of interaction between two point charges can be programmed to be directly proportional to the scalar multiplication of the magnitudes of charges and inversely proportional to the square of the distance between them. The force is applied along the straight line joining the points. If the two points have the same charge (e.g., positive and positive), the virtual electrostatic force between them is repellant (e.g., the points try move away from one another); if the two points have different charges (e.g., positive and negative), the virtual force between them is attractive (e.g., the points try to move towards one another), as shown in FIG. 4.

Coulomb's law can be stated as a mathematical expression. The scalar and vector forms of the mathematical equation are given by:

$$|F| = k_e \frac{|q_1 q_2|}{r^2} \qquad \text{Equation 1}$$

and $$|F| = k_e \frac{|q_1 q_2|}{|r_{21}|^2} r^{21}, \qquad \text{Equation 2}$$

respectively, where $k_e$ is Coulomb's constant $k_e$=8.9875× $10^9$ N•m$^2$•C$^{-z}$ and $q_1$ and $q_2$ are the signed magnitudes of the charges, the scalar r is the distance between the charges, the vector $r_{21}=r_1-r_2$ is the vector distance between the charges, and $$r^{21} = \frac{r_{21}}{|r_{21}|} \text{(a unit vector pointing from } q_2 \text{ to } q_1\text{).} \qquad \text{Equation 3}$$

For example, as shown in FIG. 2, if $q_2$ represents a point charge of an input from a sensor (e.g., a depth sensor) corresponding to a coordinate from a point cloud associated with a real world element, and $q_1$ is a point charge associated with the virtual object, then the vector form of the equation calculates the force $F_1$ applied on $q_1$ by $q_2$. The determined force can be applied to the virtual object according to one or more properties associated with the virtual object. In one implementation, a derivative of Coulomb's law is applied to simplify the computation of force applied to a virtual object. For example, the constant $k_e$ and $q_1$ can be replaced by a single constant K, if the point charges on the primitive are constant at that instance, which is given by:

$$|F_1| = K\frac{q_2}{|r_{21}|^2}\hat{r}^{21} \qquad \text{Equation 4}$$

Furthermore, other force mapping functions can be used to compute force applied to a virtual object—for example, to create a different behavior resulting from the force interaction. For example, the distance may be mapped to the force computation using a reciprocal function (e.g., $F\alpha 1/r^4$) to obtain a faster rate of force application (e.g., when a faster response time is desired form a force interaction).

(b) Use of Primitives by the Physics system Management Component 168

Returning to FIG. 1, in some implementations, the physics system management component 168 may access a data file in the primitive datastore 154 that contains primitives corresponding to virtual objects and/or virtual objects. Virtual objects may be expressed as one or more primitives. The data file may store one or more primitives, coordinates, assigned content and/or graphics corresponding to virtual objects modeled in the 3D virtual environment. In one example, primitives may be thought of building blocks of virtual objects in the 3D virtual world. Primitives include a number of parameters, which may be assigned according to the properties desired for the corresponding virtual object. For example, parameters may include at least a type, a charge, a field, a size, one or more constraints, and coordinates. A charge combined with a field describes an interactive volume of a virtual object.

A primitive's "type," as used herein, may include an identifier (ID) specifying the geometry of the primitive. Types of primitives include a point, a line or a line segment, a plane (or subset of a plane with a boundary condition, such as a circle or rectangle), an ellipsoid (e.g., a sphere), a cylinder, and a torus, which are described in more detail below. The geometric models may be specified by piecewise parametric equations corresponding to a shape and/or a size of the primitive.

In some implementations, the charge parameter of a primitive may be positive, negative, or no charge (e.g., 0)) and have a magnitude (e.g., 0<q<100). If the charge of the virtual object is the same as the charge associated with a point from a sensor input, then the force applied by the sensor input on the virtual object may be repellant, and if the charge of the virtual object is the opposite to the charge associated with a point from a sensor input, then the force applied by the sensor input on the virtual object may be attractive, for instance. In some implementations, a primitive may have multiple charges.

A "field" of the primitive, as used herein, may define an interactive boundary, or area of interactivity, of the primitive within the virtual environment. When the field is combined with a charge, it may define an "interactive volume" that specifies interaction with translated real world objects. In one example, the field parameter (e.g., 0 cm<$d_f$<=10 cm) is a distance d measured by a line segment of length d orthogonal to the core of the primitive at which, when coordinates of a sensor input are determined to be within it, the primitive becomes interactive (e.g., responds to forces acting on the primitive according to a charge associated with the field). Alternatively, the distance $d_f$ may be measured as a line segment of length d orthogonal to a core associated with the virtual object. When coordinates of a sensor input are determined to be within the boundary defined by the parameter, virtual object becomes active or interactive and is capable of responding in a defined manner to the sensor input (e.g., responsive to the application of force from the sensor input according to a charge associated with the field).

A primitive may have multiple interactive volumes. In some implementations, a primitive has at least two interactive volumes. For example, a primitive may have a first charge (e.g., zero charge) that is applied from the core to a first field distance, and a second charge (e.g., a positive or negative charge) that is applied between the first field distance and a second field distance. To continue the example, from the core to a first distance (e.g., 0 cm<=$d_{fcore}$<=5 cm), the primitive can have a zero charge to generate a neutral interactive volume. Within the neutral interactive volume, no forces are applied to the virtual object associated with the primitive, and thus no force computation is performed. In some implementations, providing a neutral interactive volume around the core of a primitive prevents an infinite amount of force from being applied to the primitive and its related virtual object; for example, at an instance due to an attempt to divide by zero during a force calculation, which can result in unwanted manipulation of a virtual object. In an example, the neutral interactive volume may be roughly correlated to the visual size or portion of the rendering of a virtual object as it appears to a user. In addition, from the first distance to the second distance (e.g., 5 cm<$d_{fforce}$<=10 cm), the field has a charge (e.g., positive or negative) that creates a repellant interactive volume (e.g., charge of field is same as charge associated with a sensor input) or an attractive interactive volume (e.g., charge of field is opposite to a charge associated with a sensor input) that governs the way that applied force (as defined by the sensor input) acts on the primitive. Beyond the second distance, the primitive is inactive. Examples of these interactive volumes are shown in conjunction with the primitives illustrated in FIGS. 5A, 5B, 5C, 5D, 5E, and 5F.

Figure 5A:
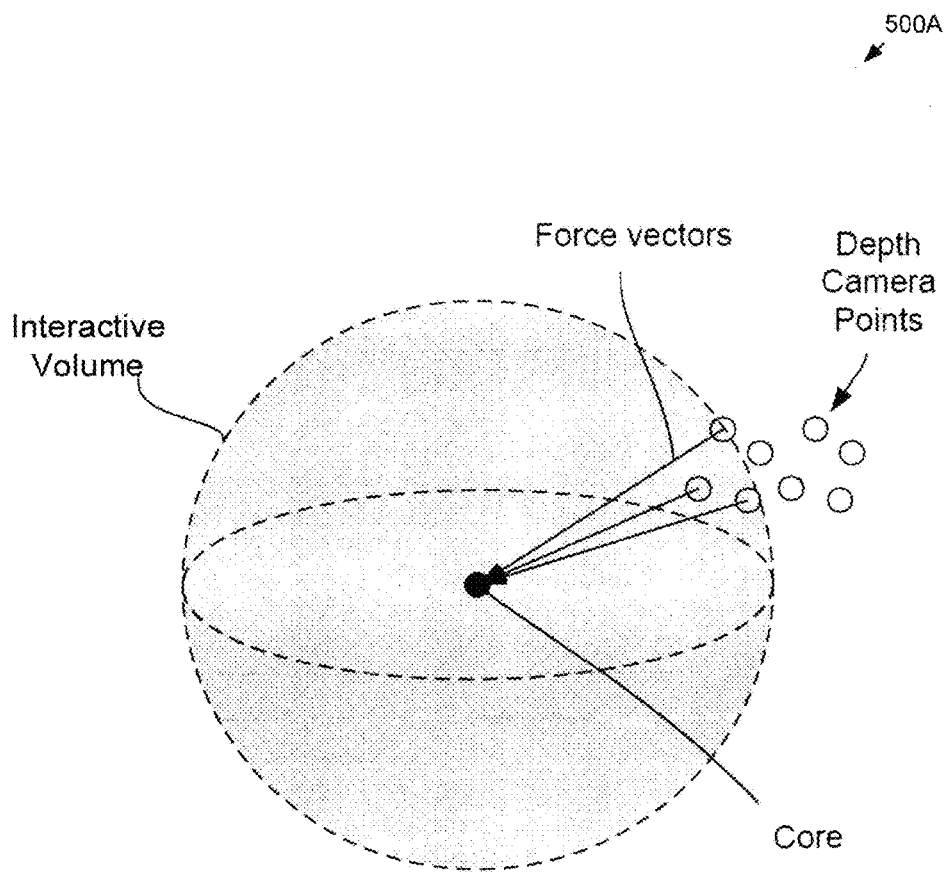
FIGS. 5A, 5B, 5C, 5D, 5E, and 5F show examples of primitives that may be used to build virtual objects, in accordance with one or more implementations.
Figure 5B:
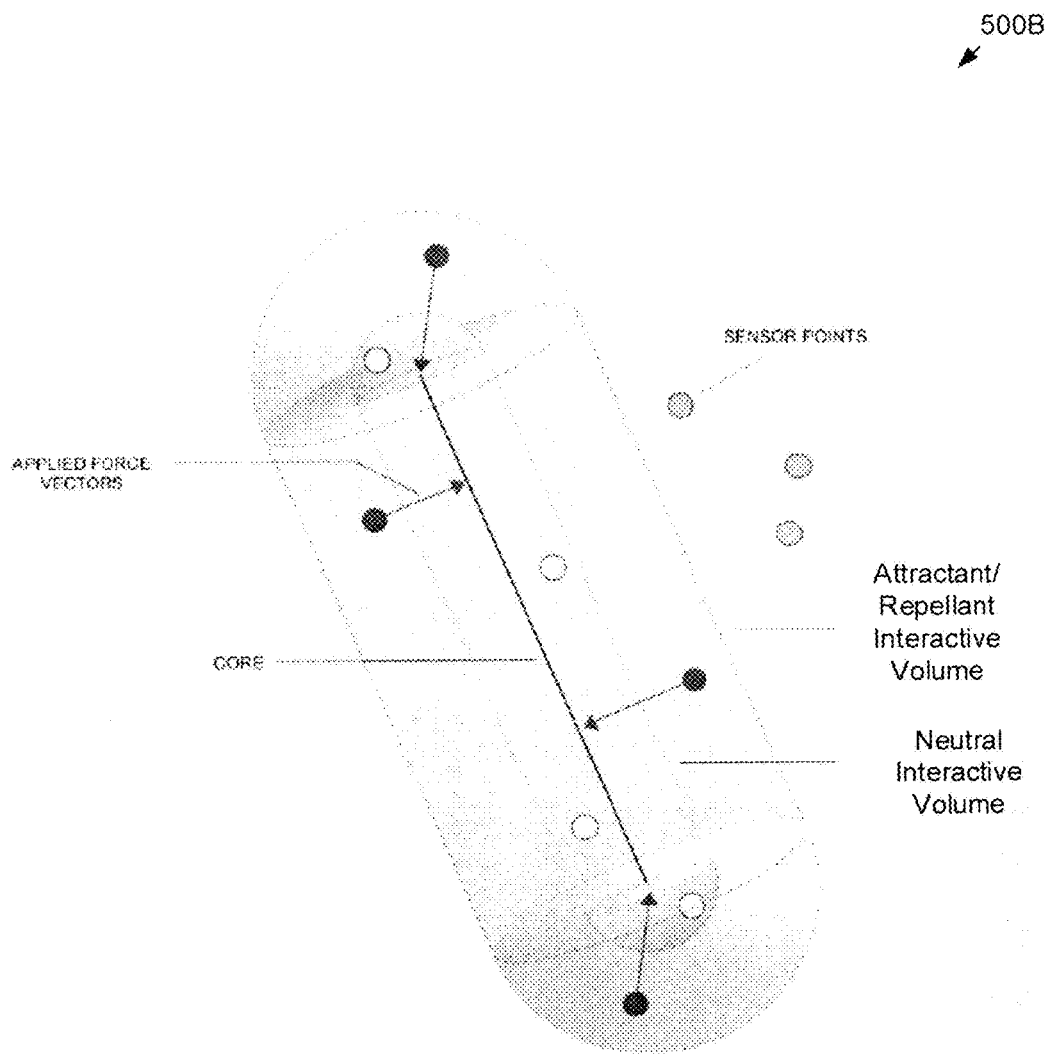
Figure 5C:
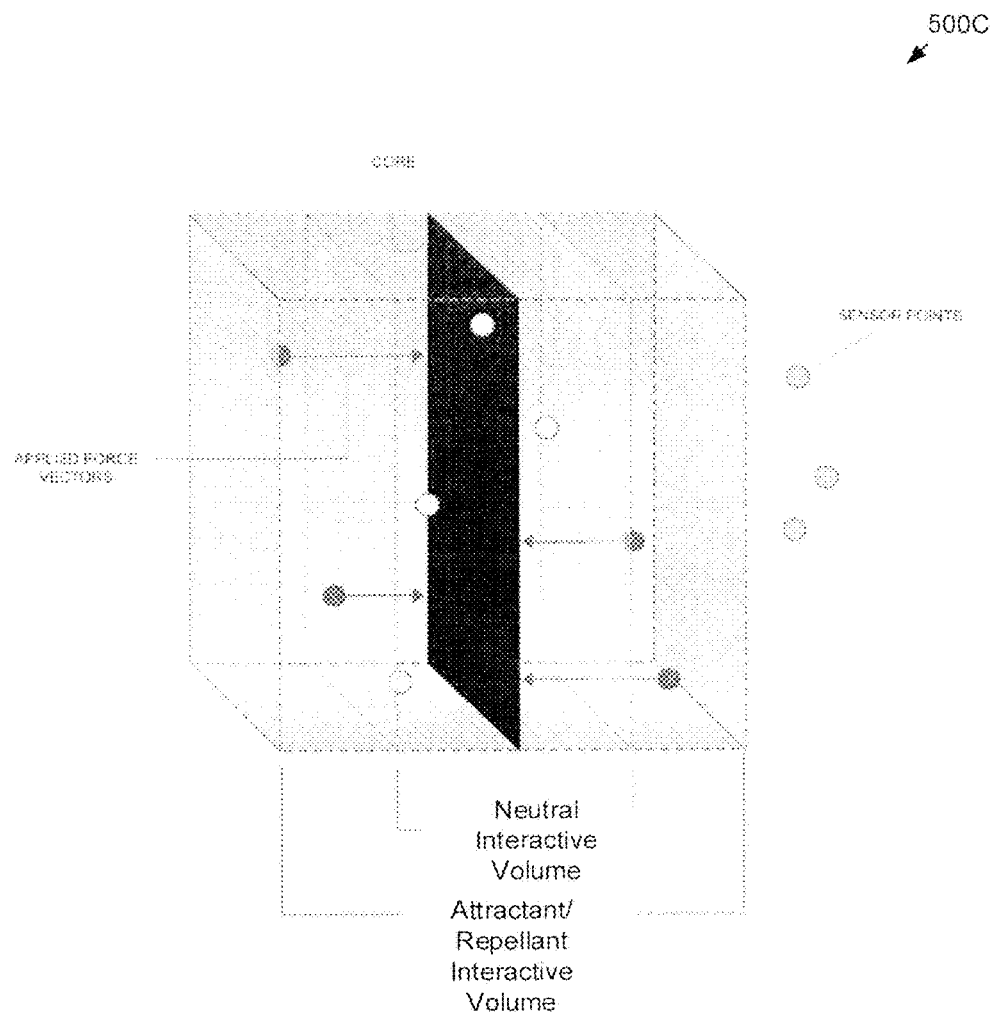
Figure 5D:
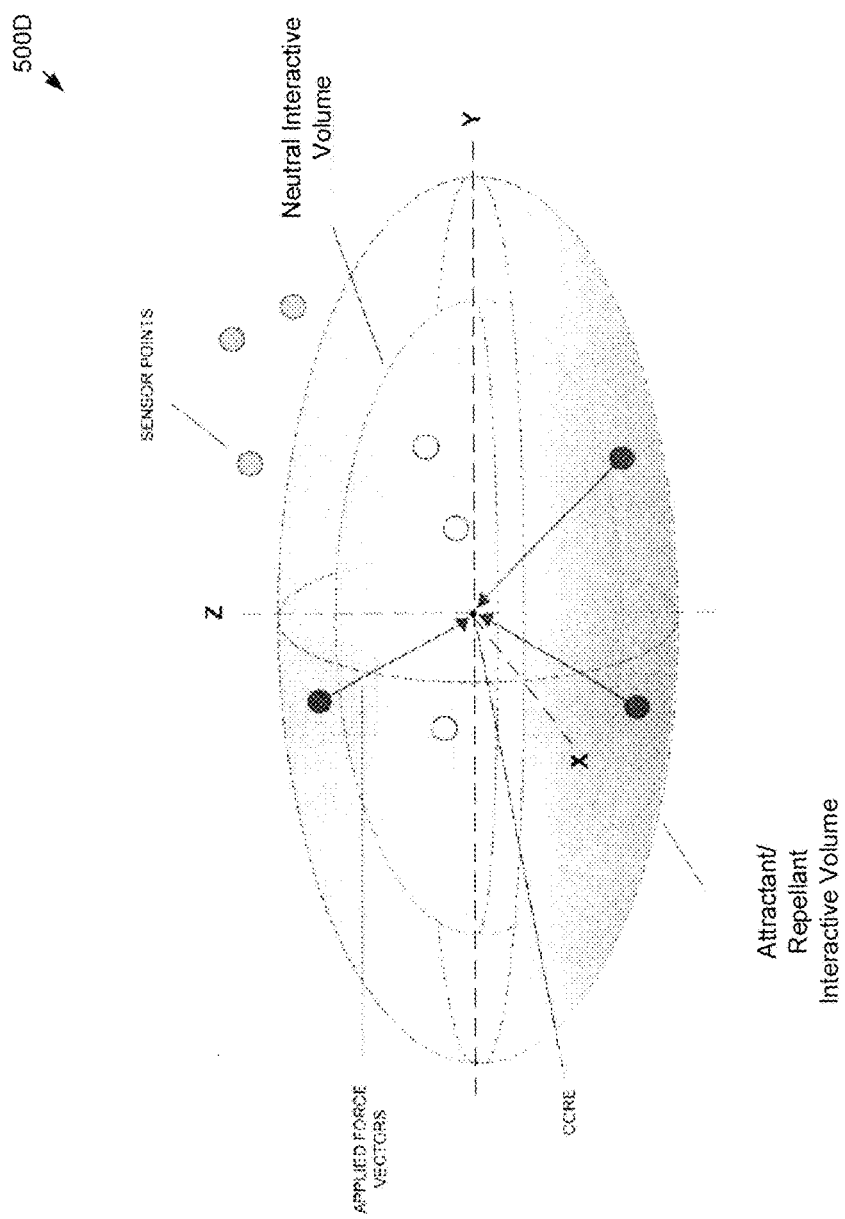
Figure 5E:
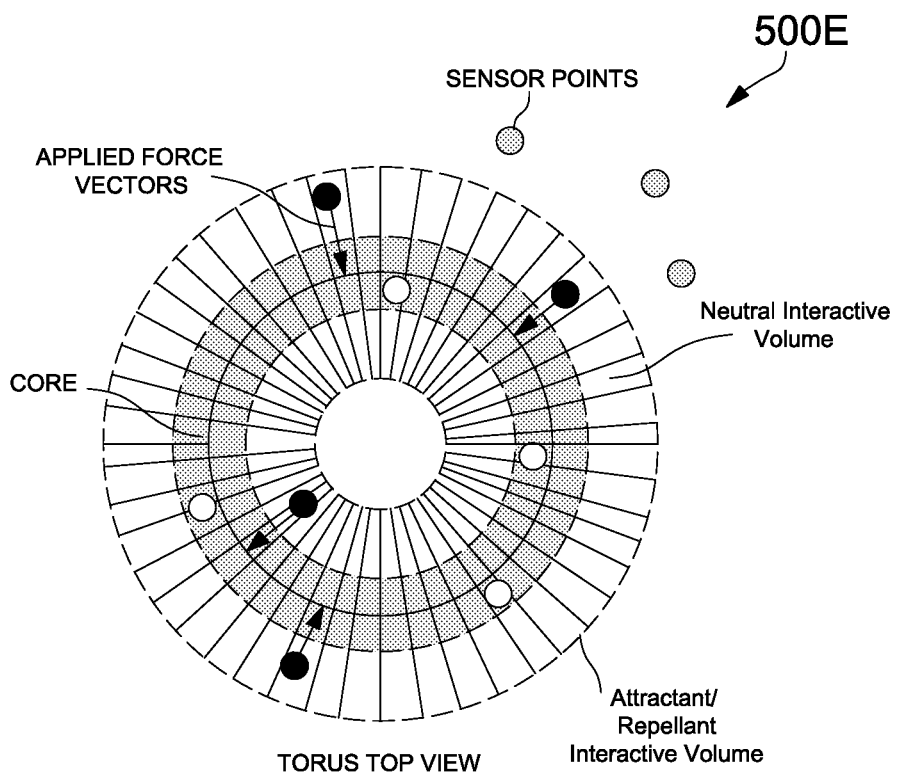
Figure 5E:
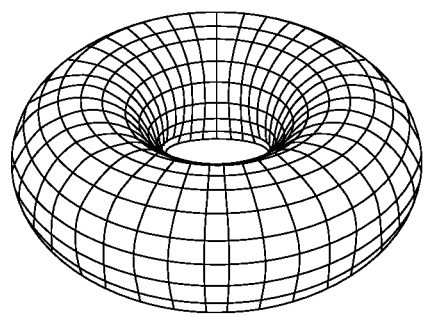
Figure 5F:
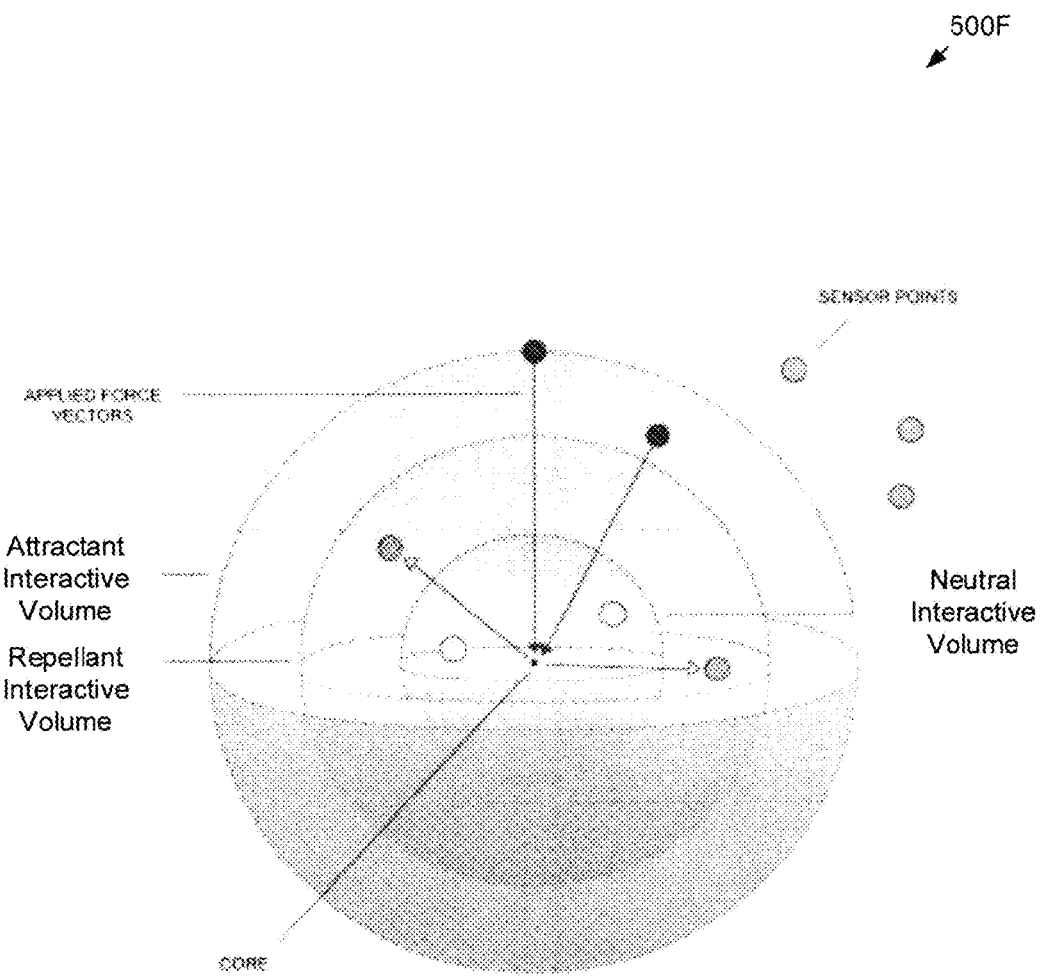

In some implementations, a primitive has three interactive volumes: an inner neutral interactive volume, an intermediate repellant interactive volume, and a third outer attractive interactive volume. In this example, the combination of interactive volumes allows a virtual object to be moved and "held" in space as the attraction and repellent forces balance in an equilibrium state (e.g., the force of repulsion is substantially equal to the force of attraction at a specified distance from the core). An example of a primitive with three interactive volumes configured in this fashion is shown in FIG. 5F. For example, assume a primitive has neutral interactive volume (e.g., 0 cm<=$d_{fcore}$<=5 cm, charge=zero), a repellant interactive volume (e.g., 5 cm<$d_{frepel}$<=10 cm charge=positive), and an attractive interactive volume (e.g., 10 cm<$d_{fattract}$<=20 cm charge=negative), and a sensor input has a positive charge. As a sensor input coordinates move within a distance of 20 cm of the primitive, the primitive experiences an attractive force and moves toward the sensor input. As long as the sensor input maintains a distance (e.g., 10 cm<$d_{sensorinput}$<=20 cm), the primitive continues to be attracted or move towards the sensor input. If the sensor input remains in place over time, the primitive continues to be attracted and moves towards the coordinates of the sensor input until the distance from the core of the primitive reaches 10 cm. At this point, the object stops, as the attractive force generated by the attractive interactive volume equals the repellant force generated by the repellant interactive volume. In this sense, a virtual object is held in the virtual space. If the sensor input coordinates move within 10 cm, the primitive experiences a repellant force and movers away from the coordinates of the sensor input, giving the primitive the appearance of body or substance to the user. As long as the sensor input maintains a distance (e.g., 5 cm<$d_{sensorinput}$<=10 cm), the primitive continues to be repelled and moves away from the sensor input. If the sensor input moves within 5 cm no force is applied to the primitive, for example, to prevent unwanted force calculations and/or virtual object manipulation.

For example, if points from a depth camera related to the sensor(s) 142 correspond to a user's hand and the primitive described in the previous paragraph (e.g., the discussion related to FIG. 5F) is incorporated into a virtual object in a virtual 3D space, the user may reach towards the virtual object, breaking the outer interactive volume of an associated primitive, and causing the virtual object to be attracted to the user's hand to the point of equilibrium between the attractive and repellent interactive volumes associated with the primitive (i.e., until it is within 10 cm of the translated coordinates of the user's hand), at which point the virtual object will come to rest. If the translated coordinates of the user's hand maintain this distance relative to the virtual object, the virtual object moves with the translated hand as long as this distance is maintained. In this manner, a user may "hold" the element. For example, when in this "hold" position, if the user's hand moves closer to the virtual object, the virtual object will move away of the user's hand, seemingly responding to the movement of the user's hand as it appears to hold the virtual object. Conversely, if the user moves his or her hand away from the virtual object with sufficient velocity, the sensor points representing the user's hand will leave the attractive interactive volume around the virtual object, and the hand will appear to release or shake off its hold of the virtual object.

In an example, a virtual object may be held using two forces (e.g., a neutral interactive volume surrounded by an attractive interactive volume) in a similar manner; however, in this instance, the virtual object can be penetrated (e.g., as there is no repellant interactive volume).

Visual parameters of the primitive may be used to define the visual properties of the primitive. For example, a size, color, and a texture parameter may be provided and used in rendering of the primitive in the virtual 3D space. In addition, a link, identifier, or pointer may be used to associate and/or map virtual content to the primitive. For example, graphics of a web page may be mapped to a panel primitive simulating a virtual 3D multi-touch pad, while allowing user interactions—including a click or other gesture—as inputs on a virtual web panel.

"Constraints" of the primitive can be used to define how the primitive responds to forces exerted on the primitive when the primitive is active. For example, a force vector and a constraint (among other parameters) may be input to a physics engine or other logic program to simulate the dynamics of the virtual 3D environment and to determine a response of the primitive to the application of the force. Examples of constraint parameters may include: drag, angular drag, mass, and center of mass, and trajectory. Drag is the force exerted in the direction opposite to the translation velocity of a primitive (e.g., 0<dragx<1, 0<dragy<1, 0<dragz<1). Angular drag is the force applied in the direction opposite to the rotational velocity of a primitive (e.g., 0<dragangular<1). Mass is the resistance of the primitive to being accelerated by a force applied to the primitive. In one example, the mass of a virtual object in the 3D virtual space may be 0.1 kg<mass<10 kg; however, other amounts and units of measurement may be used. Center of mass is the point (e.g., cm=(x, y, z)) of the primitive where a force may be applied causing the primitive to move in the direction of the applied force without rotation. Trajectory is a predefined path an object can travel in a 3D virtual space, and it constrains the possible movement of the 3D virtual object (e.g., moving on a curve). In addition, the primitive has coordinates (e.g., $p_1$=(x, y, z)) associated therewith to define its position in a virtual space and where the primitive is rendered for display.

(c) Interactive Volumes and Interactivity by Physics System Management Component 168

Returning to FIG. 1, in some implementations, the physics system management component 168 implements interactive volumes and/or interactivity. As discussed herein, primitives can be assigned an interaction volume that forms an interactive boundary that is used to determine whether—and under what circumstances—a primitive is interactive (e.g., the primitive may respond to a force based on its associated properties). For example, the interaction volume can be expressed by at least one distance parameter $d_f$ and an associated charge. The distance defines a boundary formed around the primitive at the distance $d_f$ measured orthogonally from the core of a primitive. In another example, the interaction volume can be expressed by multiple boundaries $d_{inner}$ and $d_{outer}$ (e.g., $d_{inner}$<$d_f$<=$d_{outer}$) measured orthogonally from the core of a primitive and a charge. Examples of interaction volumes in relation to various sensor input points are illustrated in FIGS. 5A, 5B, 5C, 5D, 5E, and 5F for the various primitive types. When one or more sensor inputs (e.g., coordinates of a point from the point cloud associated with a real world element) are within the boundary defined by the interaction volume, the primitive becomes interactive and force may be applied to the primitive. Thus, in one example, the interaction volume boundary can reduce the computational burden associated with processing of virtual objects in a virtual 3D space by only determining forces and/or other computations associated with virtual object that is within range of a point cloud. As a result, any point cloud that is not within the boundary of the interaction volume is not involved in any computation associated with the virtual objects.

Figure 6:
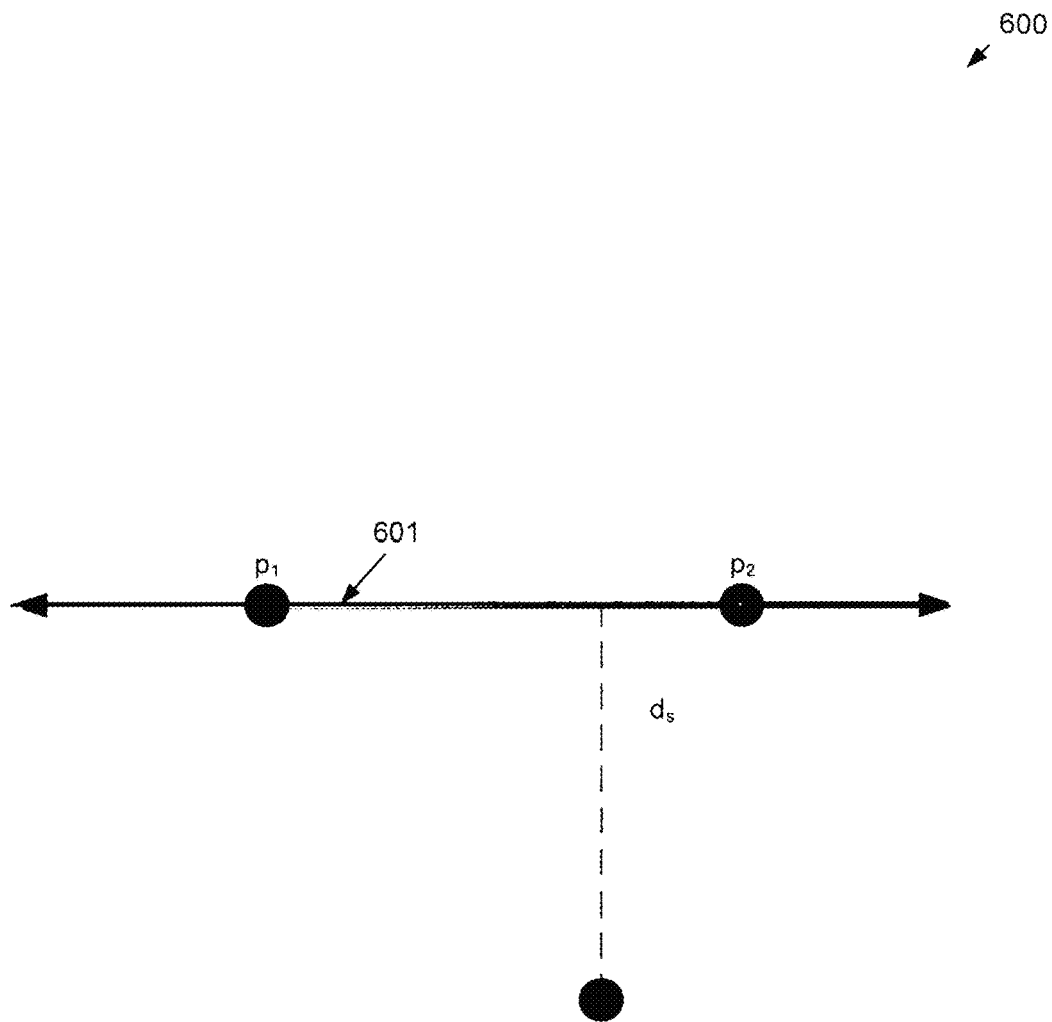
FIG. 6 illustrates an example of a boundary of an interactive volume of a primitive, in accordance with one or more implementations.

FIG. 6 illustrates an example 600 of a boundary of an interactive volume of a primitive, in accordance with one or more implementations. Included in FIG. 4 is a primitive 601. In this example, the primitive 401 may be interactive when the distance ds, corresponding to the length of a straight line segment orthogonal to a point on the core of the primitive extending from the point on the core to the coordinates of the point associated with an input from a sensor, is less than $d_f$. FIG. 6 illustrates one example of this determination for a line primitive. As shown in FIG. 6, a line primitive is expressed by two points $p_1$ ($x_1$, $y_1$, $z_1$) and $p_2$ ($x_1$, $y_1$, $z_1$) on the line segment 301. $p_{input}$ ($x_{input}$, $Y_{input}$, $z_{input}$) represents the input point from a sensor corresponding to a real world object. The shortest distance $d_s$ from $p_{input}$ to the line segment may be determined as:

$$d_s = \frac{|(p_{input} - p_1) \times_( (p_{input} - p_2)|}{|p_2 - p_1|} \qquad \text{Equation 5}$$

In this example, if $d_s$<$d_f$, then primitive 401 may be interactive (d) Virtual Object Manipulation by Physics System Management Component 168

Figure 7:
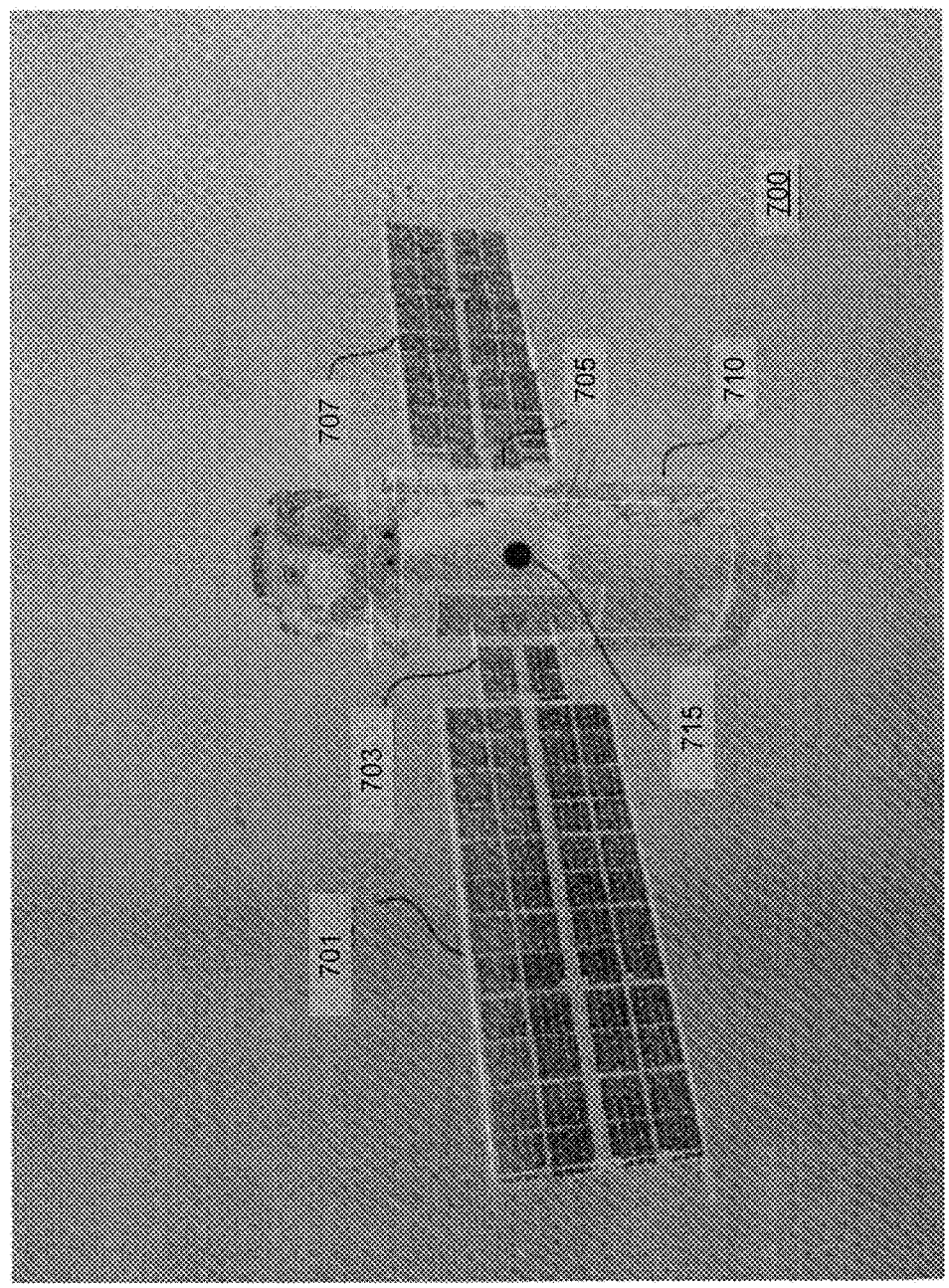
FIG. 7 illustrates an example of application of one or more primitives to content, in accordance with one or more implementations.

Returning to FIG. 1, in some implementations, the physics system management component 168 allows virtual objects to be manipulated. The manipulation of virtual objects may, but need not, depend on interactive force determinations, properties of primitives, and/or interactive volumes/interactivity discussed further herein. As an example, FIG. 7 illustrates an example 700 of the application of primitives to define content in a virtual 3D space and therefore make the content interactive (according to the parameters assigned to any underlying primitive associated with the content). In one example, content of a graphics data file includes data to render virtual 3D graphics depicting a satellite telescope in a virtual 3D space. In order to make the content interactive in the virtual space, one or more primitives are associated with the content. In one example, primitives may be utilized in a modular fashion to emulate the perceived shape of the content and to make content interactive in the virtual world. For example, four plane primitives 701, 703, 705, 707 and a cylinder primitive 710 are mapped to the content of the graphics file to create a virtual object with a center of mass 715. Together, the primitive and the graphics content create a rigid body, in which the rotation and translations of the body are coupled.

Figure 8A:
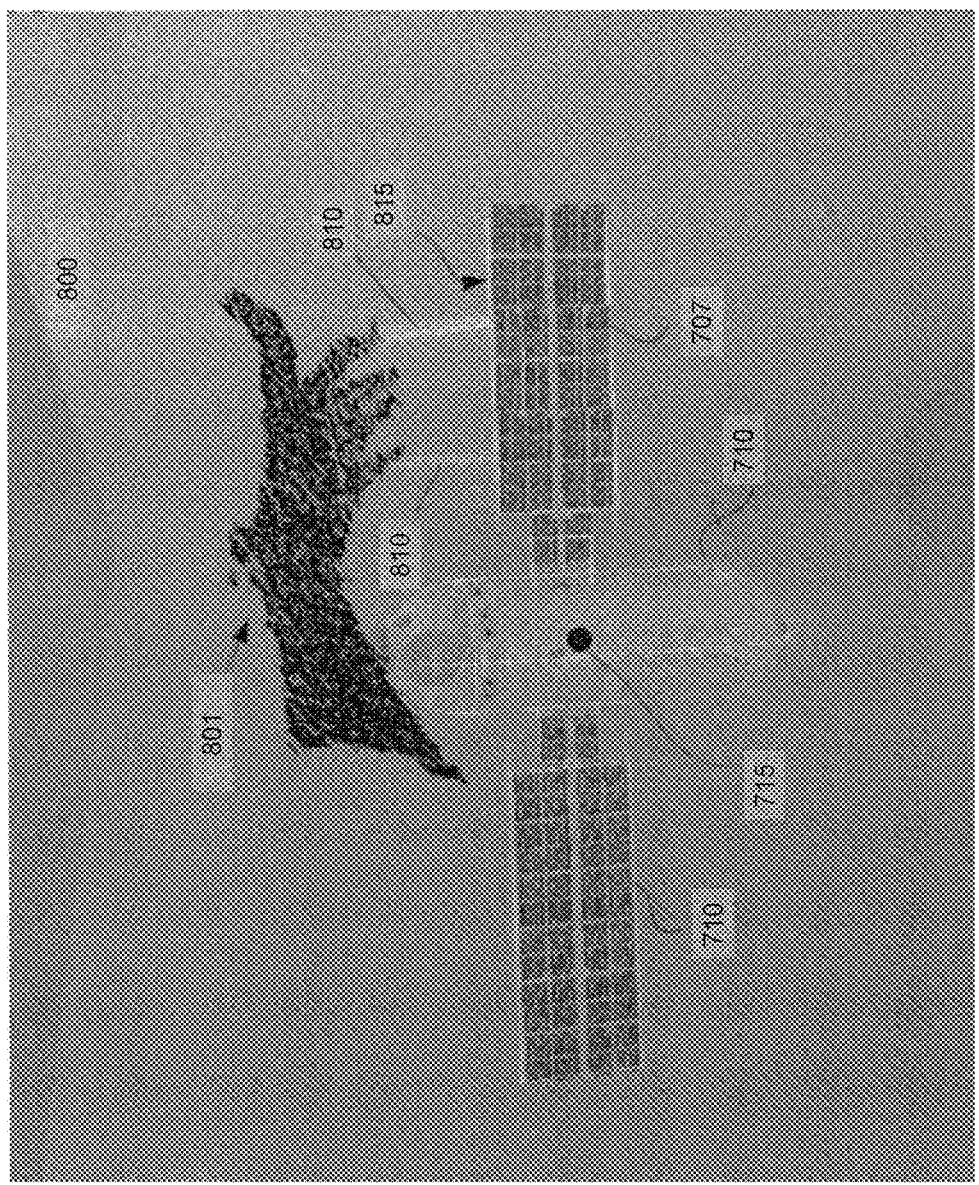
FIGS. 8A and 8B illustrate examples of application of sensor inputs, vectors, and primitives to content, in accordance with one or more implementations.
Figure 8B:
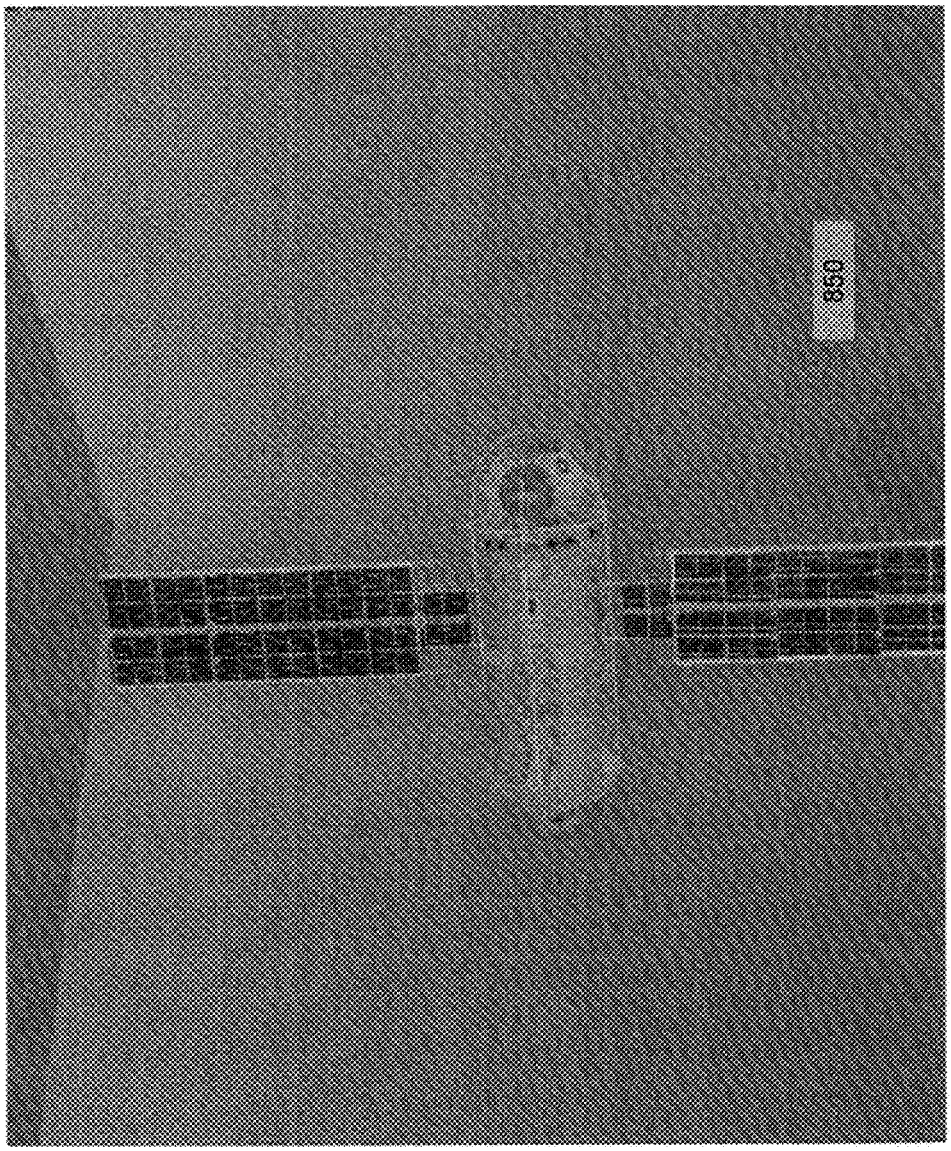

FIG. 8A illustrates an example 800 of the rendering of the virtual object of FIG. 7 (e.g., a satellite telescope) including a visual representation of point cloud 801 derived from sensor input (e.g., depth coordinates of a hand and/or stylus of user). FIG. 8A shows a first orientation 800 of the satellite telescope. Force vectors 810 are illustrated as lines extending from the hand to an edge 816 of the plane primitives 707. As the point cloud of the user's hand moves towards the edge of the plane primitives 707, a force is applied to the edge causing the plane primitives 701, 703 705, 707, and 710 and the associated content to rotate about the center of mass 716 to a new orientation 850 in the virtual space, as shown in FIG. 8B. One skilled in the art will appreciate that the illustration of the force vectors 810 as white lines is shown in FIG. 8A to aid understanding of the implementation of FIGS. 7, 8A, and 8B, and actual rendering of a virtual 3D space does not require graphic depiction of the force (much in the way force is not seen in the real world), unless depicting the force is desired in any particular application (e.g., a user tutorial on how to interact with a virtual environment). Similarly, the point cloud 801 corresponding to the sensor input does not have to be rendered or depicted unless desired. For example, in an augmented reality application, the point cloud may not be illustrated; the hand of a user may be directly viewed within the rendered virtual space interacting with the virtual objects. In another example, in a virtual reality application, the point cloud or some other visualization associated therewith can be rendered in the virtual space to aid the user in controlling, manipulating, and interacting with virtual object to show a corresponding location of the real world element and translated into the virtual world in relation to the virtual objects.

2. Virtual Object Datastore 156, Primitive Datastore 154, User Interaction Datastore 152

The virtual object datastore 156, the primitive datastore 154, and the user interaction datastore 152 may comprise electronic storage media that electronically stores information. The electronic storage media may include one or both of system storage that is provided integrally (i.e., substantially non-removable) with display system 106 and/or removable storage that is removably connectable to the display system 106 via, for example, a port (e.g., a USB port, a firewire port, etc.) or a drive (e.g., a disk drive, etc.). The virtual object datastore 156, the primitive datastore 154, and the user interaction datastore 152 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage media may include one or more virtual storage resources (e.g., cloud storage, a virtual private network, and/or other virtual storage resources). The electronic storage media may store software algorithms, information determined by processor(s) 150, information received from the display system 106, and/or other information that enables the display system 106 to function as described herein.

In some implementations, the virtual object datastore 156 is configured to store virtual objects. The primitive datastore 154 may be configured to store primitives. The user interaction datastore 152 may be configured to store user interaction data.

II. Flowcharts of Example Methods of Operation

Flowcharts of example methods of operation of the virtual environment control system 100 shown in FIG. 1 and further discussed in the context of FIGS. 2-8B are now presented herein. The operations of the methods of operation presented below are intended to be illustrative. In some implementations, methods may be accomplished with one or more additional operations not described, and/or without one or more of the operations discussed. Additionally, the order in which the operations of methods are illustrated in the figures and described below is not intended to be limiting.

Figure 9:
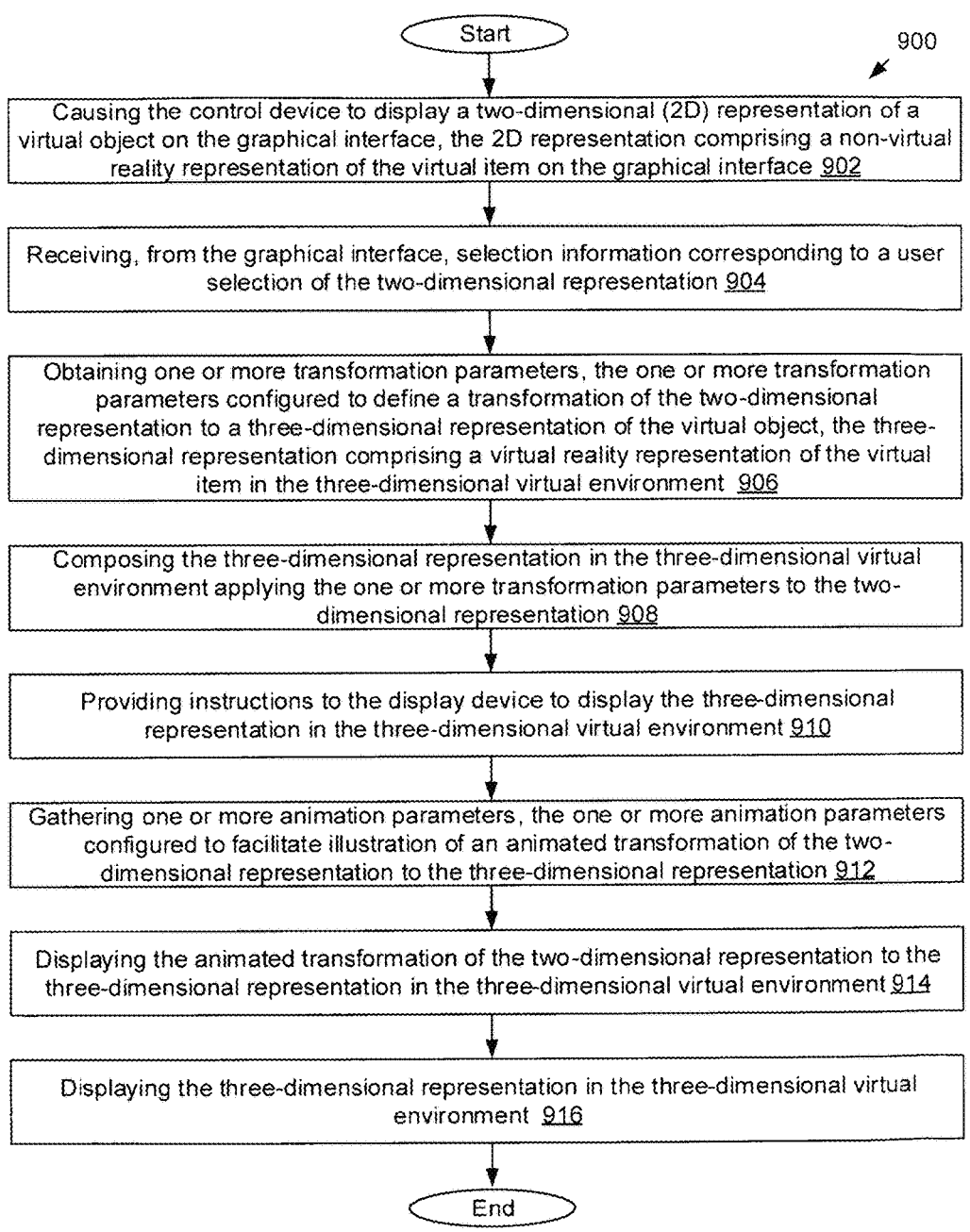
FIG. 9 is a flowchart showing an example of a process for controlling a virtual environment in a three-dimensional virtual environment displayed on a display device in response to user input into a control device having a graphical interface, in accordance with one or more implementations.

FIG. 9 is a flowchart showing an example of a process 900 for controlling a three-dimensional virtual environment displayed on a display device in response to user input into a control device having a graphical interface, in accordance with one or more implementations. The process 900 may be implemented by the control device 102, the user interaction management system 104, and/or the display system 106, shown in FIG. 1 and discussed further herein. The process 900 may be used to interact with virtual shapes, virtual screens, virtual 3D paintings, etc.

At an operation 902, a 2D representation of a virtual object may be caused to be displayed on a graphical interface. The 2D representation of the virtual object may comprise a representation of the virtual object on the graphical interface. The 2D representation of the virtual object may comprise an icon, a menu item, hyperlink, etc. displayed on a control application accessible through the graphical interface. In some examples, the 2D representation of the virtual object may comprise a representation of one or more virtual shapes (virtual cubes, virtual spheres, etc.) in the three-dimensional virtual environment. In some examples, the 2D representation of the virtual object may comprise a representation of a home or other screen of an application (e.g., a web browsing application, a painting application, etc.) on the control device.

At an operation 904, selection information that corresponds to a user selection of the 2D representation of the virtual object may be received from the graphical interface. In some implementations, the graphical interface may receive a user's selection of the 2D representation of the virtual object in the menu, etc. displayed on the graphical interface. In some implementations, the selection may be received in the control application displayed on the graphical interface.

At an operation 906, one or more transformation parameters that are configured to define a transformation of the 2D representation of the virtual object to a 3D representation of a virtual object may be obtained. In various implementations, the 3D representation of the virtual object may comprise a three-dimensional representation of the 2D representation of the virtual object in the three-dimensional virtual environment. The transformation parameters may comprise entries in a transformation parameter datastore that identify specific virtual objects in the three-dimensional virtual environment based on corresponding virtual objects (icons, 2D representations, etc.) on the control device. In some implementations, the transformation parameters may identify specific virtual primitive elements used to compose the virtual objects. The transformation parameters may provide a basis for rendering a three-dimensional representation of a virtual object in the three-dimensional virtual environment displayed on the display system.

At an operation 908, the 3D representation of the virtual object may be composed in the three-dimensional virtual environment by applying the one or more transformation parameters to the 2D representation of the virtual object. In some implementations, the transformation parameters may identify specific combinations of virtual primitive elements used to form the 3D representation of the virtual object. The 3D representation of the virtual object may be composed using the techniques identified in the process 1100 shown in FIG. 11.

At an operation 910, instructions may be provided to the display device to display the 3D representation of the virtual object in the three-dimensional virtual environment. In some implementations, instructions may be provided from an immersion virtual object management component to a virtual object display component in the display system to display the 3D representation of the virtual object in the three-dimensional virtual environment. The 3D representation of the virtual object may represent the virtual object in the three-dimensional virtual environment. The 3D representation of the virtual object may comprise a three-dimensional representation of the virtual object in the three-dimensional virtual environment, a two-dimensional representation of the virtual object in the three-dimensional virtual environment, etc.

At an operation 912, one or more animation parameters that are configured to facilitate illustration of an animated transformation of the 2D representation of the virtual object to the 3D representation of the virtual object may be gathered. The one or more animation parameters may be gathered from an animation parameter datastore. The one or more animation parameters may, e.g., allow an animation that makes the virtual object to appear to "float" out of the control device and into the three-dimensional virtual environment.

At an operation 914, the animated transformation of the 2D representation of the virtual object to the 3D representation of the virtual object may be displayed in the three-dimensional virtual environment. In various implementations, the animated transformation may be rendered into display device(s) of a display system. At an operation 916, the 3D representation of the virtual object may be displayed in the three-dimensional virtual environment. The 3D representation of the virtual object may represent the virtual object in the three-dimensional virtual environment.

Figure 10:
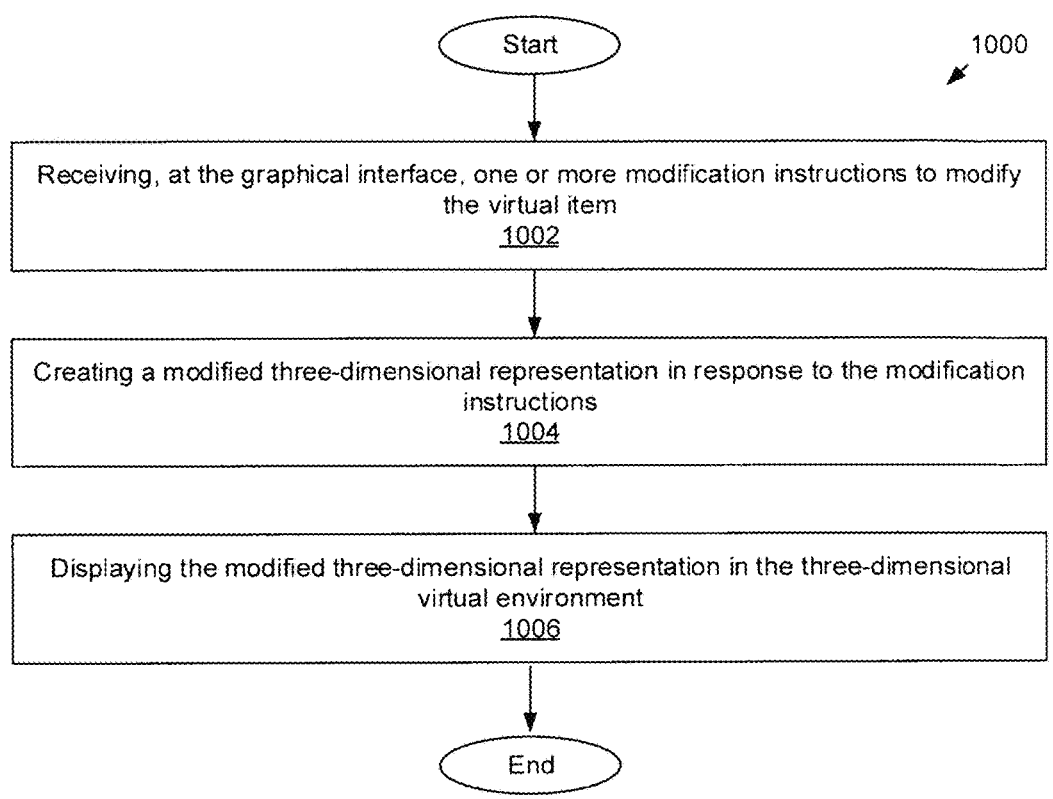
FIG. 10 is a flowchart showing an example of a process for modifying a 3D representation of a virtual object residing in a three-dimensional virtual environment, in accordance with one or more implementations.

FIG. 10 is a flowchart showing an example of a process 1000 for modifying a 3D representation of a virtual object residing in a three-dimensional virtual environment, in accordance with one or more implementations. The process 1000 may be implemented by the control device 102, the user interaction management system 104, and/or the display system 106, shown in FIG. 1 and discussed further herein. The process 1100 may be used to interact with virtual shapes, virtual screens, virtual 3D paintings, etc.

At an operation 1002, one or more modification instructions to modify the virtual object may be received at the graphical interface of the control device 102. Examples of modification instructions may include instructions related to engagement/interactions with virtual shapes, instructions related to engagement/interaction with virtual screens, and instructions related to interactions with virtual paintings. The modification instructions may be based on virtual collisions between user interaction elements and virtual objects and/or the results of virtual physics interactions between user interaction elements and virtual objects, as noted further herein.

At an operation 1004, a modified 3D representation of the virtual object may be created in response to the modification instructions. More particularly, the modification instructions may cause the 3D representation of the virtual object to be modified (e.g., change shape/size, rotate, translate, etc.) in a manner that a user intends. A modified 3D representation of the virtual object may be rendered into display device(s) of a display system. At an operation 1006, the modified 3D representation of the virtual object may be displayed in the three-dimensional virtual environment.

Figure 11:
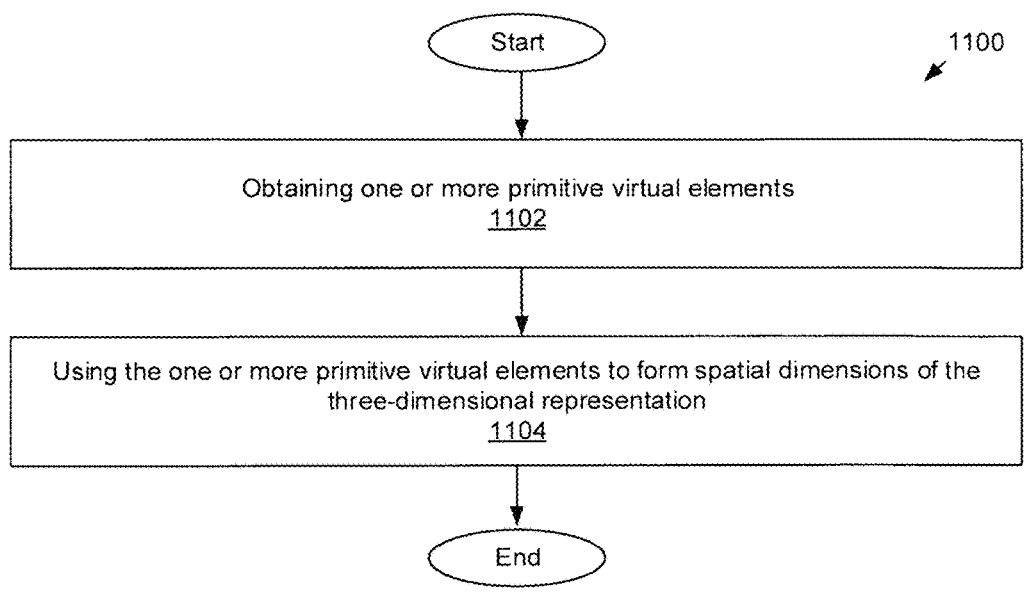
FIG. 11 is a flowchart showing an example of a process for composing a 3D representation of a virtual object in a three-dimensional virtual environment, in accordance with one or more implementations.

FIG. 11 is a flowchart showing an example of a process 1100 for composing a 3D representation of a virtual object in a three-dimensional virtual environment, in accordance with one or more implementations. The process 1100 may be implemented by the control device 102, the user interaction management system 104, and/or the display system 106, shown in FIG. 1 and discussed further herein. The process 1100 may be used to interact with virtual shapes, virtual screens, virtual 3D paintings, etc.

Figure 12:
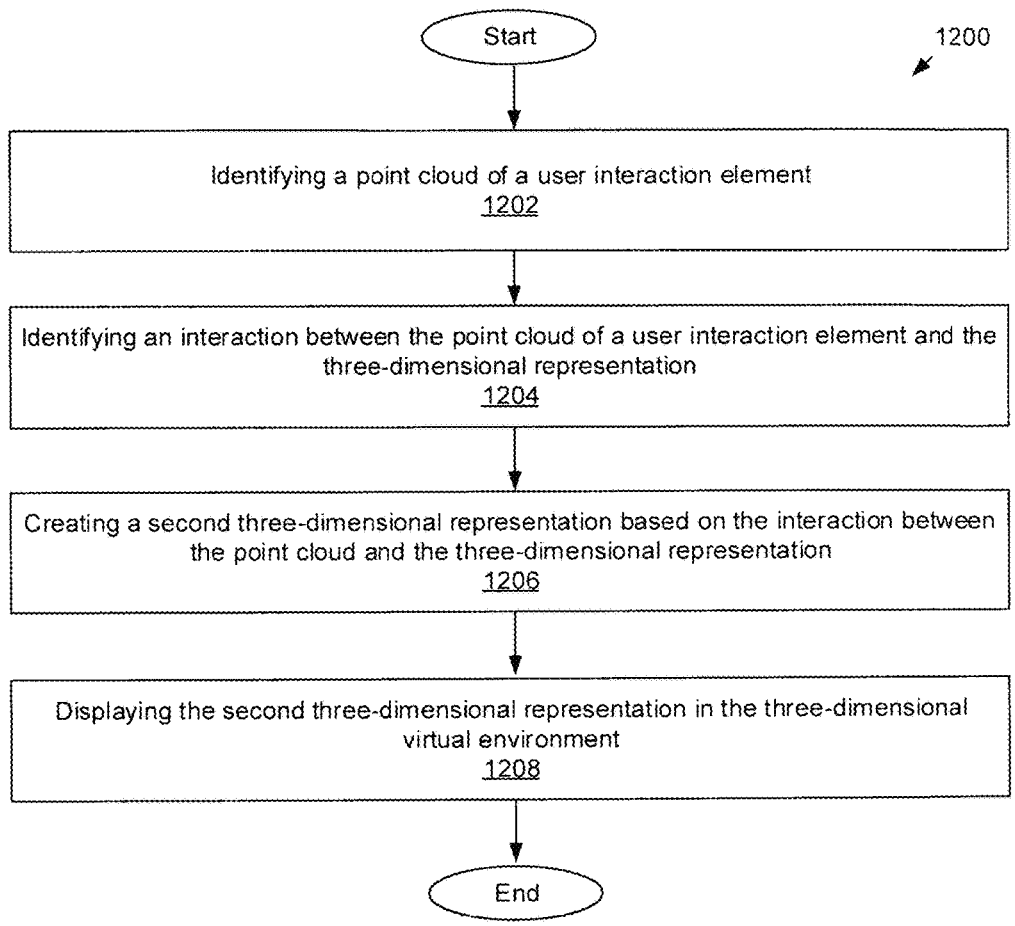
FIG. 12 is a flowchart showing an example of a process for modifying a 3D representation of a virtual object in a three-dimensional virtual environment, in accordance with one or more implementations.

At an operation 1102, one or more virtual primitive elements may be obtained. At an operation 1104, the one or more virtual primitive elements may be used to form spatial dimensions of the 3D representation of the virtual object FIG. 12 is a flowchart showing an example of a process 1200 for modifying a 3D representation of a virtual object in a three-dimensional virtual environment, in accordance with one or more implementations. The process 1200 may be implemented by the control device 102, the user interaction management system 104, and/or the display system 106, shown in FIG. 1 and discussed further herein. The process 1200 may be used to interact with virtual shapes, virtual screens, virtual 3D paintings, etc.

At an operation 1202, a point cloud of a user interaction element may be identified. In various implementations, sensor data corresponding to the user interaction element may be identified. The sensor data may represent contours, meshes, and/or other properties of the user interaction element in the physical world. The sensor data may include data related to real-world objects the user interaction element is interacting/engaging with. As example, the sensor data may include data from depth sensors and/or images from cameras that show positions of a user interaction element in the physical world.

At an operation 1204 an interaction between the point cloud of a user interaction element and the 3D representation of the virtual object may be identified. In some implementations, a collision between a projection of the point cloud of the user interaction element in the three-dimensional virtual environment, and the 3D representation of the virtual object may be identified. In various implementations, a virtual force between a projection of the point cloud of the user interaction element in the three-dimensional virtual environment, and the 3D representation of the virtual object may be identified. The interaction may be identified using the techniques shown in the process 1300 and discussed further herein. The interaction may form the basis of the user's engagement with the 3D representation of the virtual object.

At an operation 1206, a second 3D representation of the virtual object may be created based on the interaction between the point cloud and the 3D representation of the virtual object. A second 3D representation of the virtual object that shows the interaction of the user interaction element and the 3D representation of the virtual object may be identified. The second 3D representation of the virtual object may, but need not, comprise a modified version of the first 3D representation of the virtual object. At an operation 1208, the second 3D representation of the virtual object may be displayed in the three-dimensional virtual environment.

Figure 13:
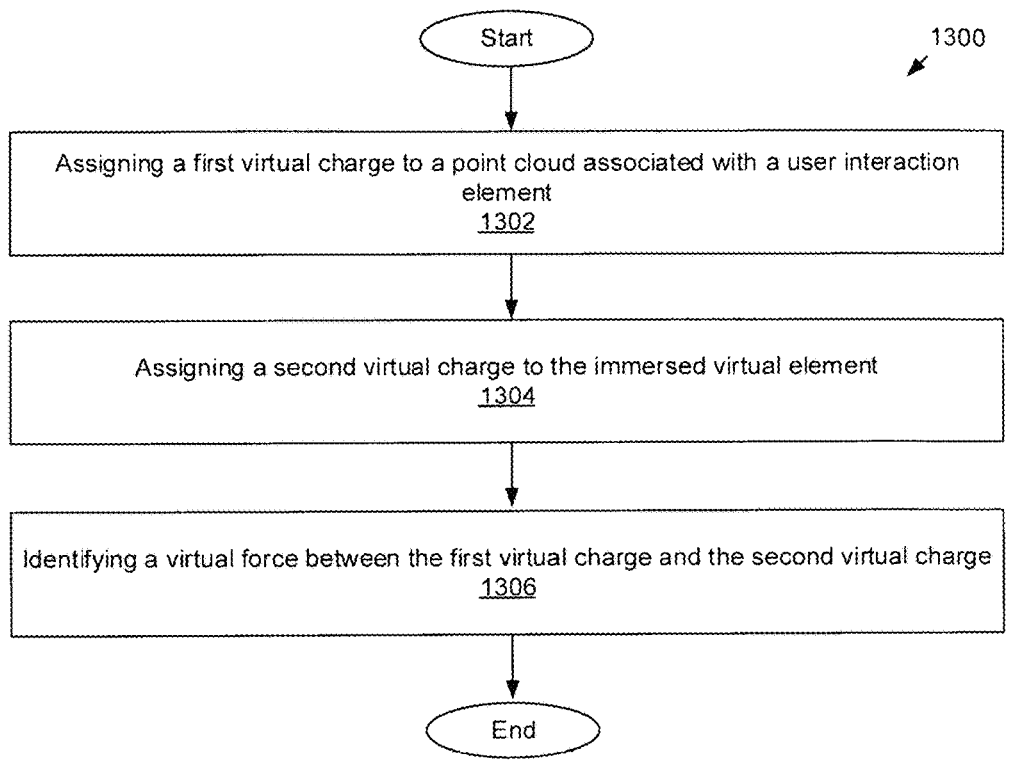
FIG. 13 is a flowchart showing an example of a process for identifying an interaction between a point cloud of a user interaction element and a 3D representation of a virtual object, in accordance with one or more implementations.

FIG. 13 is a flowchart showing an example of a process 1300 for identifying an interaction between a point cloud of a user interaction element and a 3D representation of a virtual object, in accordance with one or more implementations. The process 1300 may be used to interact with virtual shapes, virtual screens, virtual 3D paintings, etc. At an operation 1302, a first virtual charge may be assigned to a point cloud associated with a user interaction element. At an operation 1304, a second virtual charge may be assigned to the 3D representation of the virtual object. At an operation 1306, a virtual force may be identified between the first virtual chare and the second virtual charge.

Figure 14:
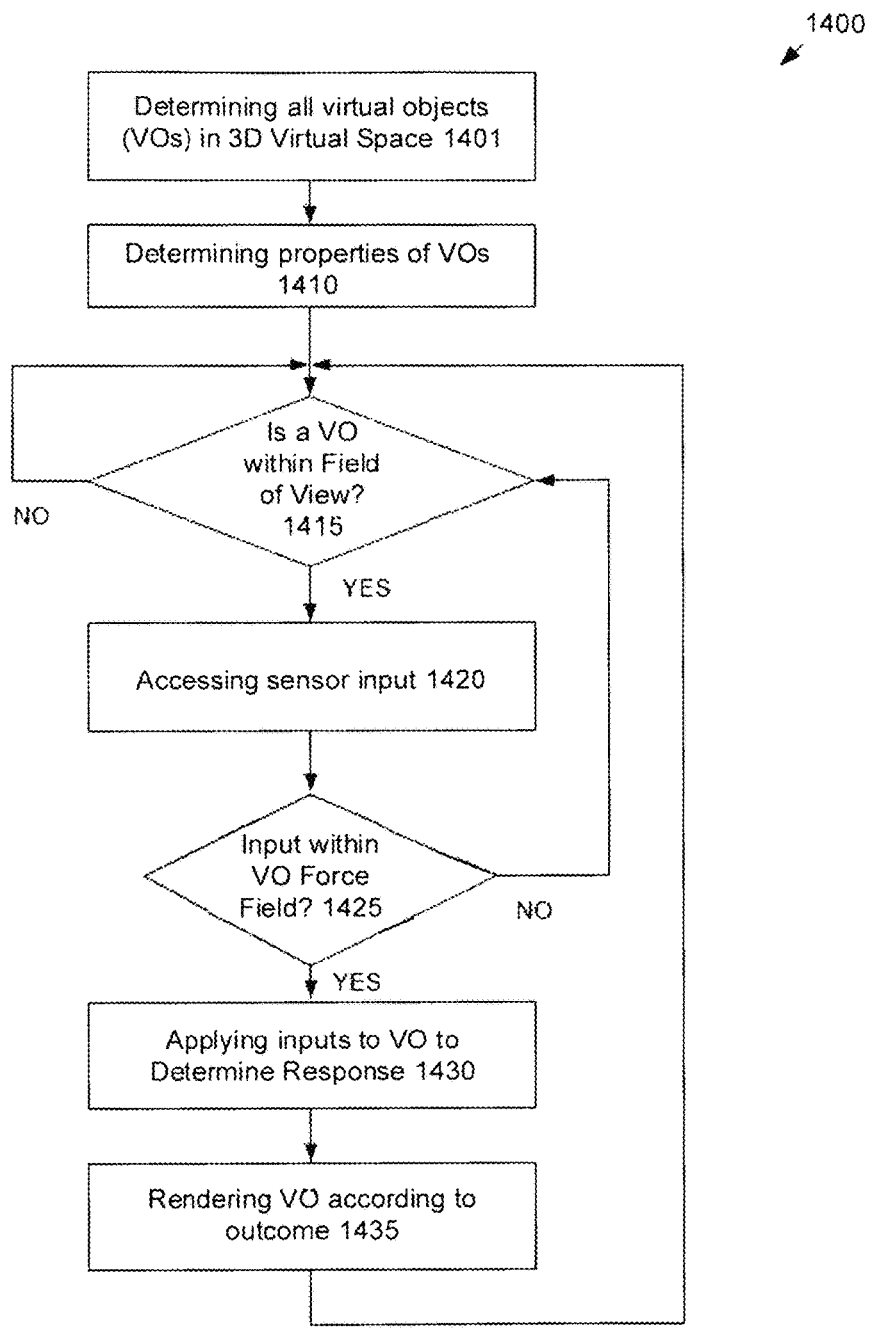
FIG. 14 is a flowchart showing an example of a process for interacting with virtual objects in a virtual environment, in accordance with one or more implementations.

FIG. 14 is a flowchart showing an example of a process 1400 for interacting with virtual objects in a virtual environment, in accordance with one or more implementations. The process 1400 may be implemented by one or more of the modules of the virtual object display component 166, the physics system management component 168, and/or other modules discussed herein. At an operation 1401, the virtual objects in the 3D virtual space may be determined. For example, one or more files corresponding to the virtual 3D space may be accessed from a memory device. The virtual objects may be mapped to initial coordinates within the 3D virtual space.

At an operation 1414, the properties of all the virtual objects determined to be in the virtual 3D space may be accessed from a corresponding file in a memory device. For example, the primitives and their corresponding parameters may be accessed, such as an interaction volume (e.g., charge and one or more field boundaries).

At an operation 1415, it may be determined whether a virtual object may be in a field of view of a sensor. For example, a sensor detecting real world objects may be oriented to coincide with the field of view of a user of a head mounted display (HMD). As the camera may be pointed in a direction corresponding to the movement of the head of user, the view in the virtual 3D space may be mapped to coincide with the movement of the sensor and head. Scanning continues with movement of the user's and/or camera's field of view.

When one or more virtual objects may be detected, any sensor input corresponding to the field of view may be accessed in operation 1420. For example, frames of input from a depth sensor may be accessed and inputs of real world elements mapped to the virtual 3D space. In one example, a hand of user may be detected and mapped or translated to coordinates in the virtual 3D space.

At an operation 1425, for any sensor input, it may be determined whether any of the sensor input may be within an interaction volume of a virtual object. For example, a shortest distance calculation as explained above in association with FIG. 2 may be performed to determine whether a coordinate in the virtual space corresponding to a sensor input may be within boundary of a virtual object as defined by the interaction volume parameter. A spatial partitioning method (i.e., a process of dividing space into indexed and searchable regions) may be applied to speed up the boundary-checking process, and may reduce the computation overhead on the distance calculation. If no sensor input may be detected within the interaction volume of a virtual object, the process returns to operation 1415.

At an operation 1430, for a virtual object having its interaction volume penetrated by a sensor input, the sensor inputs may be applied to the virtual object to determine how the virtual object responds. For example, a force may be determined and applied to the virtual object to determine a response of the virtual object to the applied force.

At an operation 1435, the virtual objects may be rendered according to the outcome of the response determined in operation 1430, and the process returns to operation 1415.

Figure 15:
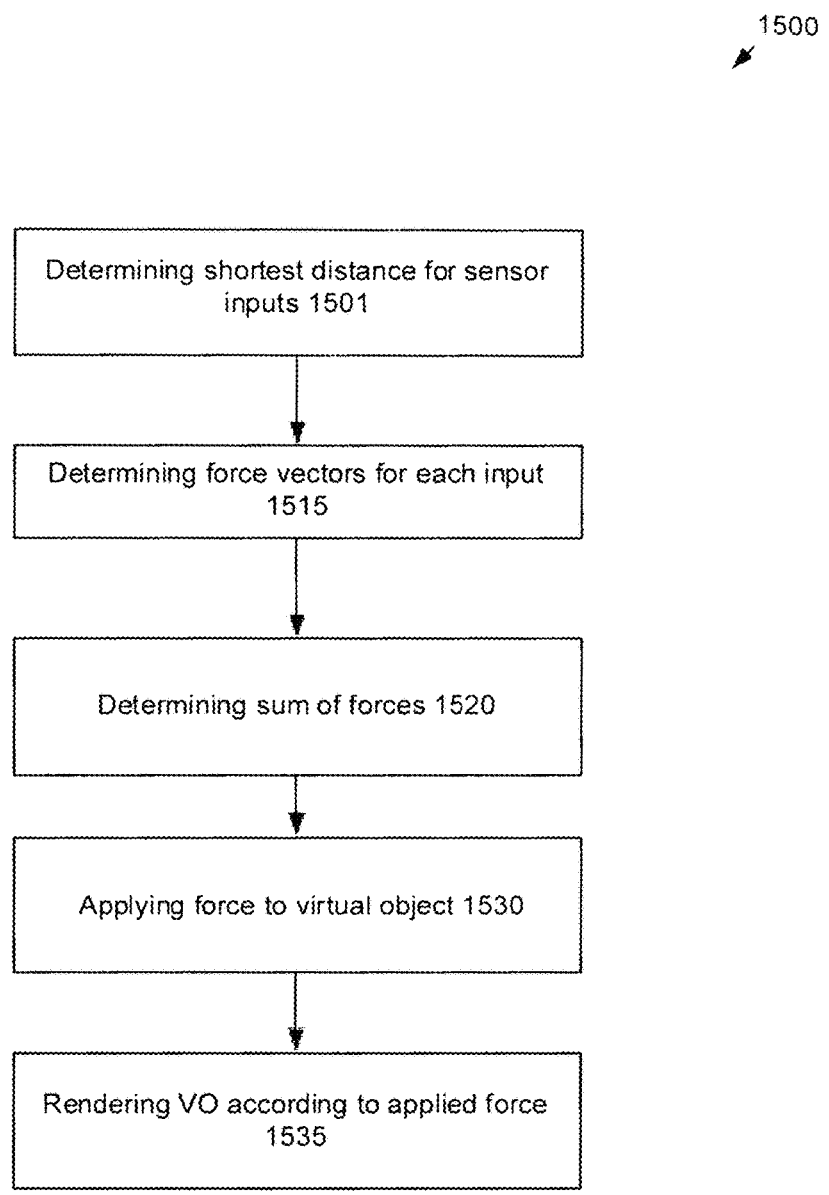
FIG. 15 is a flowchart showing an example of a process for application of sensor inputs to a virtual object in a virtual environment, in accordance with one or more implementations.

FIG. 15 is a flowchart showing an example of a process 1500 for application of sensor inputs to a virtual component in a virtual environment, in accordance with one or more implementations. In an example, the process 1500 is implemented as part of operation 1430 in the process 1400 shown in FIG. 14.

At an operation 1501, the shortest distance $d_s$ to a virtual object for a sensor input may be determined. For example, the length of a straight line segment orthogonal to a point on the core extending from the point on the core to the coordinates of a point pi (e.g., associated with an input from a sensor) may be determined.

At an operation 1510, a force vector for a sensor input may be determined. For example, the charge and magnitude of the interaction volume may be determined (e.g., $q_1$) and the charge and magnitude of the input from the sensor may be determined (e.g., $q_i$) and the force may be calculated as:

$$F_1 = k_e \frac{q_1 q_i}{|r_{i1}|^2} d_s^{i1} \qquad \text{Equation 6}$$

At an operation 1520, the forces for all vectors of points within the interaction volume of the virtual object may be summed to determine the total force exerted on the element. For example, the total force exerted on the element can be calculated through the use of the equation: F_f=Sum(F_i)

At an operation 1530, the sum of the forces may be applied to the virtual object and an outcome may be determined based on the result of that application. For example, the calculated force for a vector and the parameters of the primitive (e.g., a constraint such as mass and center of mass) may be put into a physics engine or other logic that defines the nature of a manipulation of virtual objects in the virtual 3D space. In one implementation, the physics engine may be a process or application including a collection of equations simulating real world physics and the application of forces. For example, given the force, mass, and center of mass of the virtual object, the physics engine determines a direction and distance travelled in the virtual space from the application of the force, such as determining the linear and angular momentum of a primitive by determining the position and velocity of the primitive relative to the coordinate for the primitive's center of mass.

At an operation 1535, the outcome may be rendered and acted upon. For example, the output from the physics engine describing a direction of movement, an end move coordinate and an orientation may be provided to processor for translation to a graphics rendering of the virtual object in space over time. For example, an application of force to a virtual object may move the virtual object in the virtual 3D space from a first coordinate to a second coordinate along a line and distance determined by the engine. In another example, a force may be applied to a virtual button or touch panel. The movement of the button along a direction of constraint may cause the button to be rendered as depressed and an input corresponding to depressing the button may be activated (e.g., hitting an enter button on a virtual keypad).

III. Example Hardware Implementations

A. Example Processing System 1600

Figure 16:
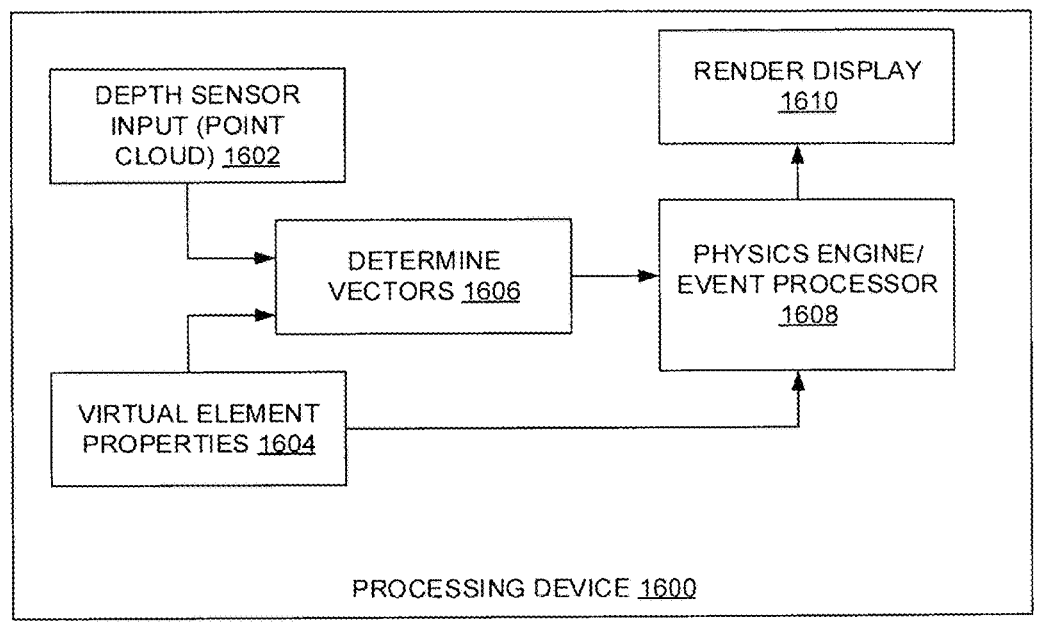
FIG. 16 shows a block diagram illustrating example components of a processing system, in accordance with some implementations.

FIG. 16 shows a block diagram illustrating example components of a processing system 1600, in accordance with some implementations. The processing system 1600 may include a depth sensor input system 1602, a virtual element properties system 1604, a vector determination system 1606, a physics engine/event processor 1608, and a display rendering system 1610. One or more of the elements of the processing system 1600 may correspond to one or more of the elements of the display system 106, shown in FIG. 1.

In some implementations, inputs from a depth sensor input system 1602 and parameters for a virtual element provided to the virtual element properties system 1604 may be input to the vector determination system 1606. In various implementations, the vector determination system 1606 may implement one or more of the vector determinations derived by the process 900 shown in FIG. 9, the process 1000 shown in FIG. 10, the process 1100 shown in FIG. 11, the process 1200 shown in FIG. 12, the process 1300 shown in FIG. 13, and/or the process 1400 shown in FIG. 14. The vectors determined by the vector determination system 1606 along with the parameters are inputs to the physics engine/event processor 1608 (which may comprise physics engine(s), event engine(s), user interaction engine(s), and/or any other defined logic to determine events and render of content associated with a virtual element within a 3D virtual environment based on the input from the sensors). The data may be output to another program or application to cause rendering of the content associated with an event for viewing by a user. For example, the output may be provided to the display rendering system 1610 for rendering in a display or other visual output device. In this manner, input corresponding to real world objects may be used to influence and manipulate virtual elements using a charge and interaction volume.

B. Example Head Mounted Display System (HMD) 1700

FIGS. 17A, 17B, 17C, 17D, and 17E illustrate examples of head mounted display (HMD) components of a system for displaying a virtual environment, in accordance with one or more implementations.

Figure 17A:
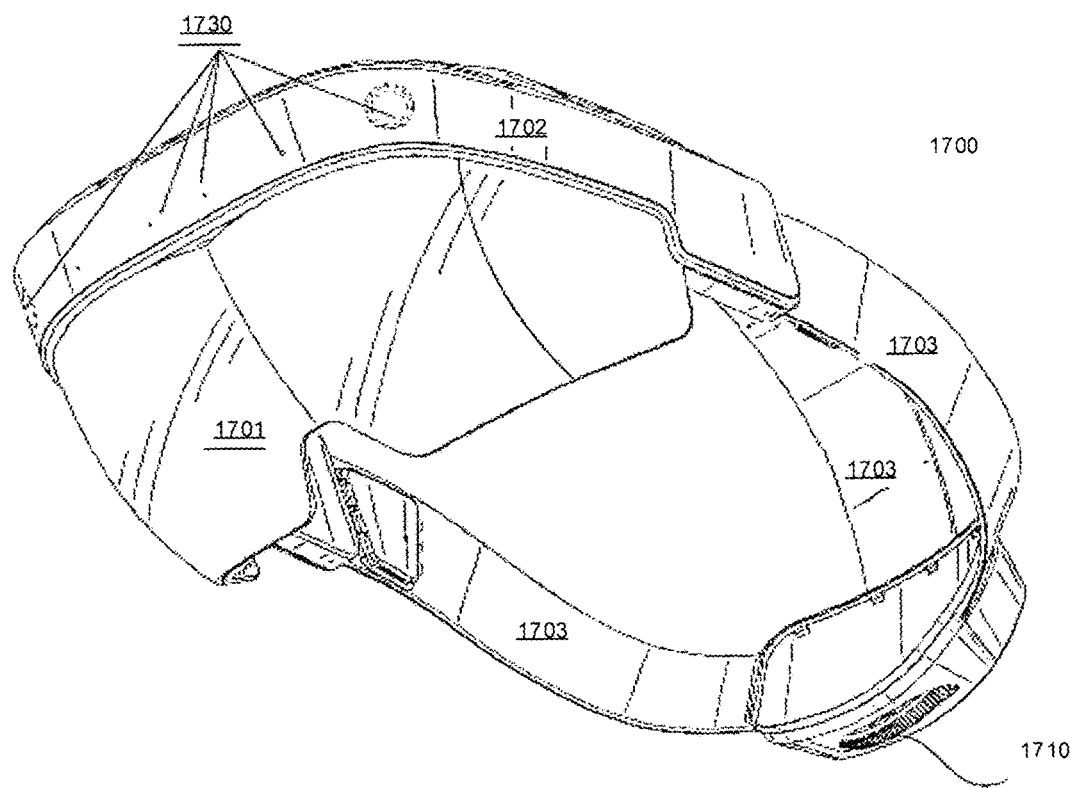
FIGS. 17A, 17B, 17C, 17D, and 17E illustrate examples of head mounted display components of a system for displaying a virtual environment, in accordance with one or more implementations.
Figure 17B:
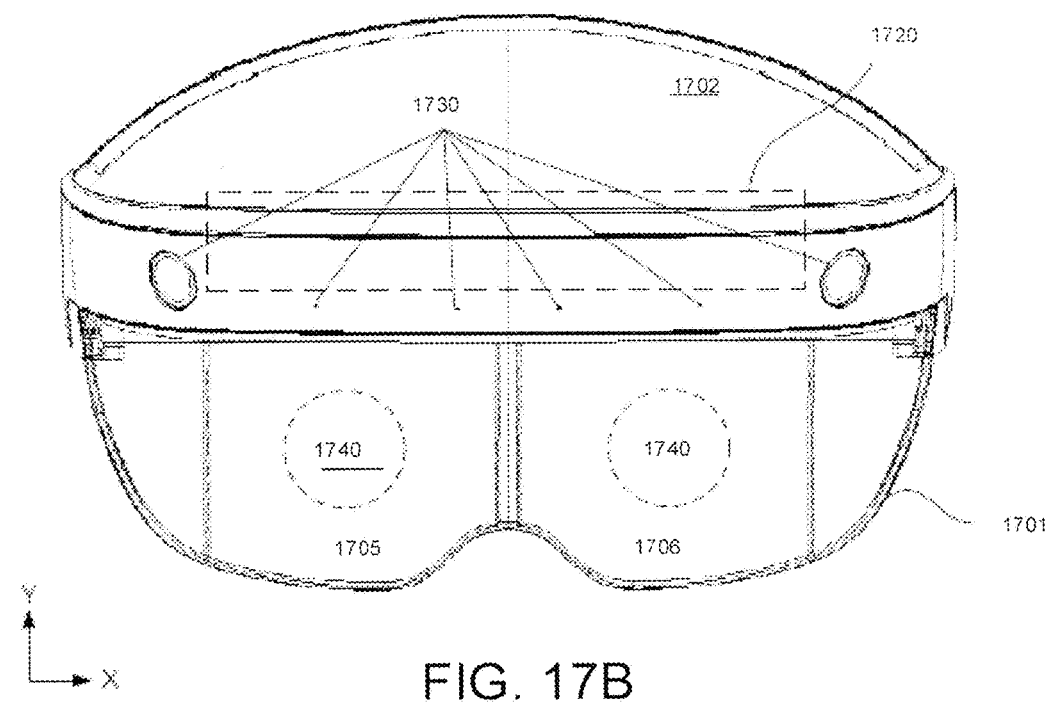
Figure 17C:
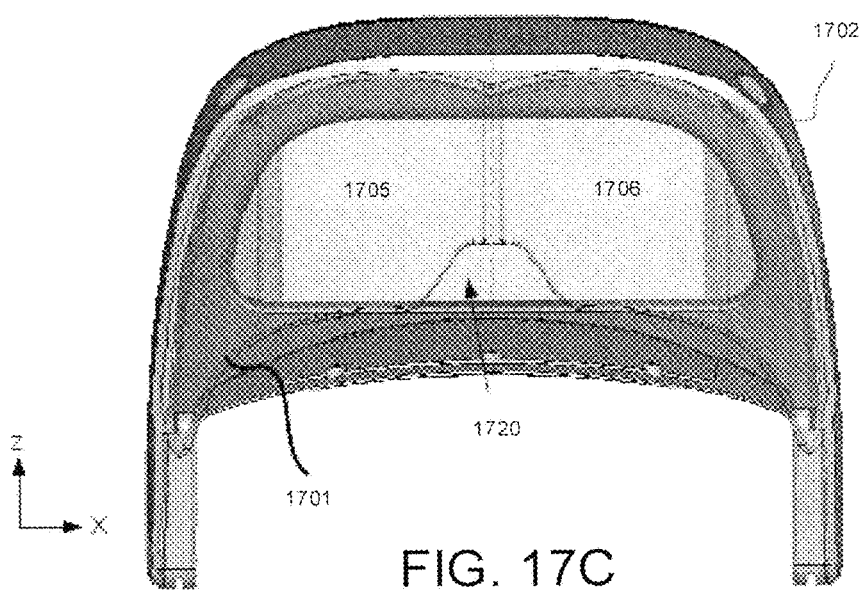

FIGS. 17A, 17B, and 17C show a perspective view, front view, and bottom view, respectively, of one example of an HMD 1700. As shown the HMD includes a visor 1701 attached to a housing 1702, straps 1703, and a mechanical adjuster 1710 used to adjust the position and fit of the HMD to provide comfort and optimal viewing by a user of the HMD 1700. The visor 1701 may include one or more optical elements, such as an image combiner, that includes a shape and one or more reflective coatings that reflect an image from an image source 1720 to the eyes of the user. In one example, the coating is partially reflective allowing light to pass through the visor to the viewer and thus create a synthetic image in the field of view of the user overlaid on the user's environment and provide an augmented reality user interface. The visor 1701 can be made from a variety of materials, including, but not limited to, acrylic, polycarbonate, PMMA, plastic, glass, and/or the like and can be thermoformed, single diamond turned, injection molded, and/or the like to position the optical elements relative to an image source and eyes of the user and facilitate attachment to the housing of the HMD.

In one implementation, the visor 1701 may include two optical elements, for example, image regions 1705, 1706 or clear apertures. In this example, the visor 1701 also includes a nasal or bridge region, and two temporal regions. The image regions are aligned with the position 1740 of one eye of a user (e.g., as shown in FIG. 17B) to reflect an image provided from the image source 1720 to the eye of a user of the HMD. A bridge or nasal region is provided between the two image regions to connect the image regions 1705 and the image regions 1706. The image regions 1705 and 1706 mirror one another through the y-z plane that bisects the nasal rejoin. In one implementation, the temporal region extends to an outer edge of the image region wrapping around the eyes to the temple housing of the HMD to provide for peripheral vision and offer support of the optical elements such that the image regions 1705 and 1706 do not require support from a nose of a user wearing the HMD.

Figure 17D:
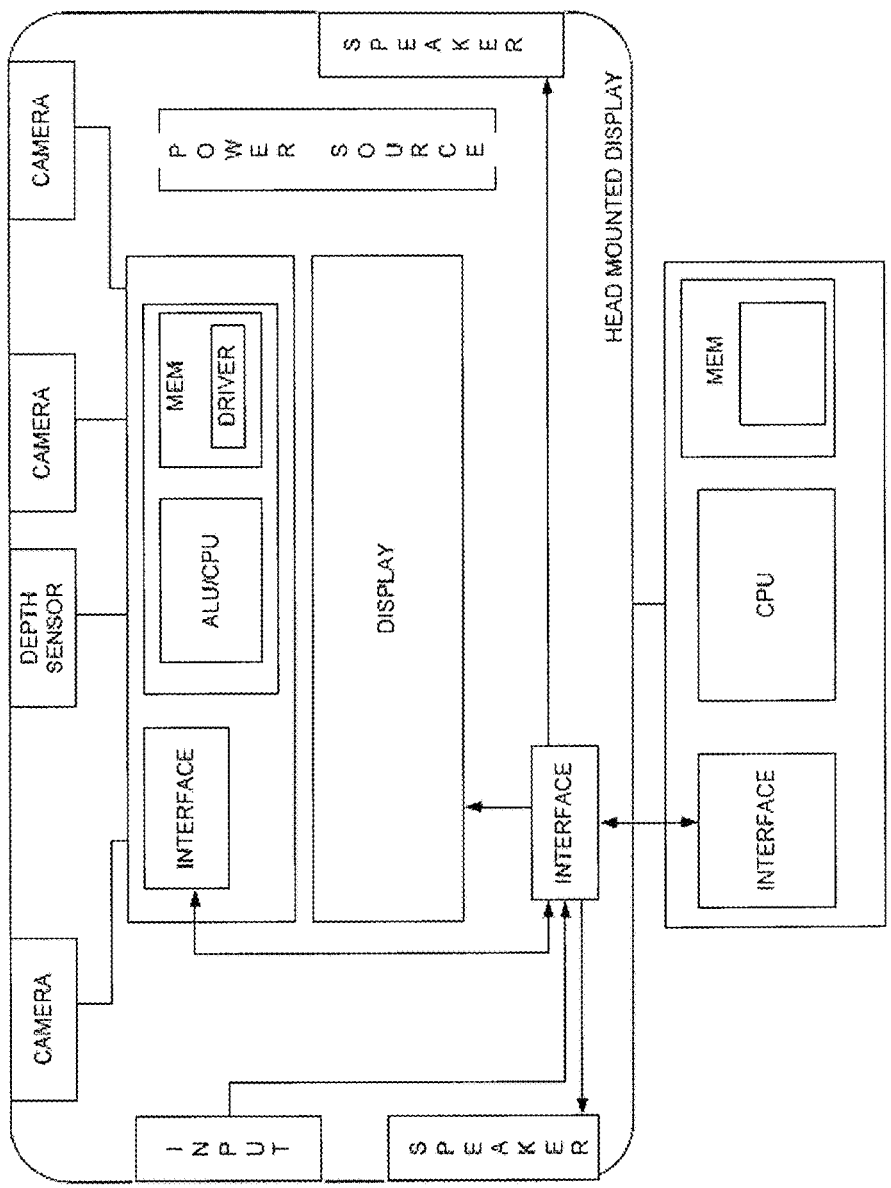
Figure 17E:
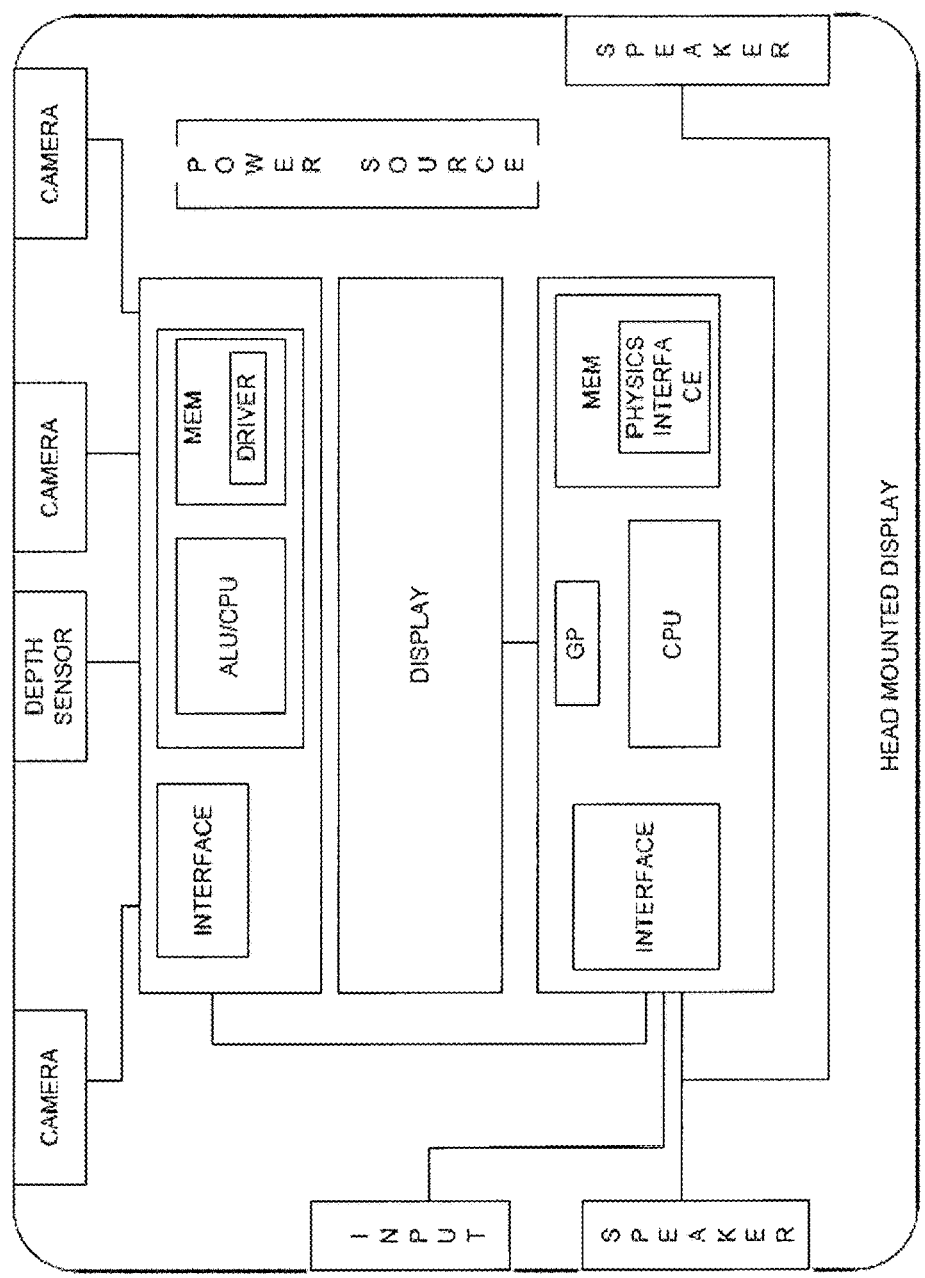

In one implementation, the housing may include a molded section to roughly conform to the forehead of a typical user and/or may be custom-fitted for a specific user or group of users. The housing may include various electrical components of the system, such as sensors 1730, a display, a processor, a power source, interfaces, a memory, and various inputs (e.g., buttons and controls) and outputs (e.g., speakers) and controls in addition to their various related connections and data communication paths. FIG. 17D shows an example implementation in which the processing device is implemented outside of the housing 1702 and connected to components of the HMD using an interface (e.g., a wireless interface, such as Bluetooth or a wired connection, such as a USB wired connector); FIG. 17E shows some implementations in which the processing device is implemented inside of the housing 1702.

The housing 1702 positions one or more sensors 1730 that detect the environment around the user. In one example, one or more depth sensors are positioned to detect objects in the user's field of vision. The housing also positions the visor 1701 relative to the image source 1720 and the user's eyes. In one example, the image source 1720 may be implemented using one or more displays. For example, the image source may be a single display. If an optical element of the image regions 1705, 1706 of the visor is provided for eyes of user(s), the display may be partitioned into at least two halves. For example, the halves may display an image intended for a separate eye. In another example, two displays may be provided. In this example, the display is paired with a corresponding optical element or image area, where the pair provides an image to an eye of the user. Examples of displays include a liquid crystal display (LCD), a Light Emitting Diode (LED) display, a flexible organic LED (OLED) display, a Liquid Crystal on Silicon (LCoS or LCOS) and/or a fiber optic projection system. In one example, a single 4.5- to 5.2-inch diagonal Liquid Crystal Display (LCD) may be used. In another example, dual 2.8-3.4-inch diagonal LCDs, one for eyes, may be used.

In some implementations, the display may be part of a mobile phone or other mobile device that is separate from, but placed within and/or affixed to, the HMD and/or HMD housing and is subsequently detachable or removable therefrom. For example, a user-accessible opening may be provided to accept and position a mobile phone or other mobile device with a display to provide an image source for the HMD. In this example, a hatch or a slot is configured to accept the mobile phone or other mobile device and provide access to a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that accept and detachably lock and position the display of the mobile device or mobile phone outside the field of view and at the geometries allowing reflection to the user's eyes.

As shown in FIGS. 17D and 17E, a processing device may implement one or more applications or programs. In one example, the processing device includes an associated memory storing one or more applications implemented by the processing device that generate digital image data depicting one or more of graphics, a scene, a graphical user interface, a computer game, a movie, content from the Internet, such as web content accessed from the World Wide Web, among others, that are to be presented to a viewer of the wearable HMD. Examples of applications include media players, mobile applications, browsers, video games, and graphic user interfaces, to name but a few. In addition, virtual elements corresponding to output of the various applications may be made interactive through use of a 3D environment application implemented using any of the processes described herein.

One example (of a head mounted display system and components thereof) is described in U.S. patent application Ser. No. 14/945,372 titled "Wide Field of View Head Mounted Display Apparatuses, Methods and Systems" filed Nov. 17, 2015, which is herein incorporated by reference in its entirety.

As described above, the techniques described herein for a wearable AR system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as, internal hard disks or removable disks; magneto-optical disks; and CD-ROM and DVD-ROM disks. The processor and the memory can be supplemented by, or incorporated in special purpose logic circuitry.

The HMD may include various other components including various optical devices and frames or other structure for positioning or mounting the display system on a user allowing a user to wear the vision system while providing a comfortable viewing experience for a user. The HMD may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs.

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method to facilitate user interaction with a virtual object in a three-dimensional virtual environment displayed on a head-mounted display device in response to user input into a control device having a graphical interface, the method comprising:
   causing the head-mounted display device to display the three-dimensional virtual environment, wherein the head-mounted display causes a user of the head-mounted display to perceive the three-dimensional virtual environment as being present in a real-world environment;
   causing the control device to display a two-dimensional (2D) representation of a virtual object on the graphical interface, wherein the control device is in wireless electronic communication with the head-mounted display device;

receiving, from the graphical interface, selection information corresponding to a user selection of the 2D representation;

obtaining one or more transformation parameters based on the selection information, the one or more transformation parameters being configured to define a transformation of the 2D representation to a three-dimensional (3D) representation of the virtual object, the 3D representation of the virtual object being in the three-dimensional virtual environment;

composing the 3D representation of the virtual object in the three-dimensional virtual environment, the composing comprising applying the one or more transformation parameters to the 2D representation;

providing instructions to the head-mounted display device to display the 3D representation of the virtual object in the three-dimensional virtual environment.

2. The method of claim 1, wherein the 3D representation of the virtual object is configured to interact with a user.

3. The method of claim 1, wherein the 2D representation resides in a control application loaded into memory of the control device.

4. The method of claim 1, further comprising:
loading a control application into memory of the control device; and
rendering the 2D representation in the control application.

5. The method of claim 1, wherein:
the graphical interface is incorporated into a control application loaded into memory of the control device; and
receiving the selection of the 2D representation comprises receiving instructions to select the 2D representation at a menu displayed by the control application.

6. The method of claim 1, further comprising:
gathering one or more animation parameters, the one or more animation parameters configured to facilitate illustration of an animated transformation of the 2D representation to the 3D representation of the virtual object; and
displaying the animated transformation of the 2D representation to the 3D representation of the virtual object in the three-dimensional virtual environment.

7. The method of claim 6, wherein the animated transformation displays the virtual object floating out of the control device into the three-dimensional virtual environment.

8. The method of claim 1, further comprising:
receiving, at the graphical interface, one or more modification instructions to modify the virtual object; and
displaying a modified 3D representation of the virtual object in the three-dimensional virtual environment.

9. The method of claim 1, further comprising:
identifying an interaction between a point cloud of a user interaction element and the 3D representation of the virtual object;
creating a second 3D representation of the virtual object based on the interaction between the point cloud and the 3D representation of the virtual object;
displaying the second 3D representation of the virtual object in the three-dimensional virtual environment.

10. The method of claim 9, wherein the virtual object comprises a virtual painting, and the 3D representation of the virtual object comprises a three-dimensional representation of the virtual painting displayed in the three-dimensional virtual environment.

11. The method of claim 9, wherein:
identifying the interaction between the point cloud of the user interaction element and the 3D representation of the virtual object comprises:
assigning a first virtual charge to the point cloud;
assigning a second virtual charge to the 3D representation of the virtual object; and
identifying a virtual force between the first virtual charge and the second virtual charge; and
creating a second 3D representation of the virtual object comprises using the virtual force to model the interaction between the point cloud and the 3D representation of the virtual object.

12. The method of claim 11, wherein the virtual object comprises a virtual painting, and the 3D representation of the virtual object comprises a three-dimensional representation of the virtual painting displayed in the three-dimensional virtual environment.

13. The method of claim 9, wherein the virtual object comprises a shape in a virtual reality application.

14. The method of claim 9, wherein the virtual object comprises a virtual screen of an application executing on the control device.

15. The method of claim 1, wherein the graphical interface comprises a touchscreen interface.

16. The method of claim 1, wherein the control device comprises one or more of a networked phone, a tablet computing device, and a laptop computer.

17. The method of claim 1, composing the 3D representation of the virtual object comprises:
obtaining one or more virtual primitive elements; and
using the one or more virtual primitive elements to form spatial dimensions of the 3D representation of the virtual object.

18. A system for facilitating user interaction with a virtual object in a three-dimensional virtual environment displayed on a head-mounted display device in response to user input into a control device having a graphical interface, the system comprising:
a head-mounted display device configured to display the three-dimensional virtual environment, wherein the head-mounted display causes a user of the head-mounted display to perceive the three-dimensional virtual environment as being present in a real-world environment;
a control device in wireless electronic communication with the head-mounted display device, the control device having a graphical interface;
a processing unit in communication with the control device and the head-mounted display device, the processing unit comprising:
memory;
one or more physical computer processors coupled to the memory, the one or more physical computer processors configured by computer readable instructions stored in the memory to perform a computer-implemented method, the computer-implemented method comprising:
providing instructions to the control device to display a 2D representation of a virtual object on the graphical interface;
receiving, from the graphical interface, selection information corresponding to a selection of the 2D representation;

obtaining one or more transformation parameters based on the selection information, the one or more transformation parameters being configured to define a transformation of the 2D representation to a 3D representation of the virtual object, the 3D representation of the virtual object being in the three-dimensional virtual environment;

composing the 3D representation of the virtual object in the three-dimensional virtual environment, the composing comprising applying the one or more transformation parameters to the 2D representation; and providing instructions to the head-mounted display device to display the 3D representation of the virtual object in the three-dimensional virtual environment.

19. The system of claim 18, the 3D representation of the virtual object being in the three-dimensional virtual environment.

20. The system of claim 18, wherein the 2D representation resides in a control application loaded into memory of the control device.

21. The system of claim 18, wherein the method further comprises:
loading a control application into memory of the control device; and
rendering the 2D representation in the control application.

22. The system of claim 18, wherein:
the graphical interface is incorporated into a control application loaded into memory of the control device; and
receiving the selection of the 2D representation comprises receiving instructions to select the 2D representation at a menu displayed by the control application.

23. The system of claim 18, wherein the method further comprises:
gathering one or more animation parameters, the one or more animation parameters configured to facilitate illustration of an animated transformation of the 2D representation to the 3D representation of the virtual object; and
displaying the animated transformation of the 2D representation to the 3D representation of the virtual object in the three-dimensional virtual environment.

24. The system of claim 23, wherein the animated transformation displays the virtual object floating out of the control device into the three-dimensional virtual environment.

25. The system of claim 18, wherein the method further comprises:
receiving, at the graphical interface, one or more modification instructions to modify the virtual object; and
displaying a modified 3D representation of the virtual object in the three-dimensional virtual environment.

26. The system of claim 18, wherein the method further comprises:
identifying an interaction between a point cloud of a user interaction element and the 3D representation of the virtual object;
creating a second 3D representation of the virtual object based on the interaction between the point cloud and the 3D representation of the virtual object;
displaying the second 3D representation of the virtual object in the three-dimensional virtual environment.

27. The system of claim 26, wherein the virtual object comprises a virtual painting, and the 3D representation of the virtual object comprises a three-dimensional representation of the virtual painting displayed in the three-dimensional virtual environment.

28. The system of claim 26, wherein:
identifying the interaction between the point cloud of the user interaction element and the 3D representation of the virtual object comprises:
assigning a first virtual charge to the point cloud;
assigning a second virtual charge to the 3D representation of the virtual object; and
identifying a virtual force between the first virtual charge and the second virtual charge; and
creating the second 3D representation of the virtual object comprises using the virtual force to model the interaction between the point cloud and the 3D representation of the virtual object.

29. The system of claim 28, wherein the virtual object comprises a virtual painting, and the 3D representation of the virtual object comprises a three-dimensional representation of the virtual painting displayed in the three-dimensional virtual environment.

30. The system of claim 28, wherein the virtual object comprises a shape in a virtual reality application.

31. The system of claim 30, wherein the virtual object comprises a virtual screen of an application executing on the control device.

32. The system of claim 18, wherein the graphical interface comprises a touchscreen interface.

33. The system of claim 18, wherein the control device comprises one or more of a networked phone, a tablet computing device, and a laptop computer.

34. The system of claim 18, composing the 3D representation of the virtual object comprises:
obtaining one or more virtual primitive elements; and
using the one or more virtual primitive elements to form spatial dimensions of the 3D representation of the virtual object.

35. The system of claim 18, wherein the processing unit is incorporated into the head-mounted display device.

36. The system of claim 18, wherein the processing unit is coupled to the head-mounted display device over a computer-readable medium.

* * * * *